(12) United States Patent
Bosco et al.

(10) Patent No.: US 9,807,358 B2
(45) Date of Patent: Oct. 31, 2017

(54) METHOD AND SYSTEM FOR CHROMATIC GAMUT EXTENSION, CORRESPONDING APPARATUS AND COMPUTER PROGRAM PRODUCT

(71) Applicant: STMicroelectronics S.r.l., Agrate Brianza (IT)

(72) Inventors: Angelo Bosco, Giarre (IT); Filippo Naccari, Tremestieri Etneo (IT); Mirko Guarnera, San Giovanni la Punta (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 346 days.

(21) Appl. No.: 14/608,637

(22) Filed: Jan. 29, 2015

(65) Prior Publication Data
US 2015/0221281 A1    Aug. 6, 2015

(30) Foreign Application Priority Data

Feb. 6, 2014 (IT) .............................. TO2014A0094

(51) Int. Cl.
| | |
|---|---|
| *G06F 15/00* | (2006.01) |
| *G03F 3/08* | (2006.01) |
| *G06K 9/00* | (2006.01) |
| *H04N 9/31* | (2006.01) |
| *H04N 9/67* | (2006.01) |
| *G09G 5/02* | (2006.01) |

(52) U.S. Cl.
CPC ........... *H04N 9/3182* (2013.01); *G09G 5/026* (2013.01); *H04N 9/3173* (2013.01); *H04N 9/67* (2013.01); *G09G 2320/0242* (2013.01); *G09G 2340/06* (2013.01)

(58) Field of Classification Search
None
See application file for complete search history.

(56) References Cited

U.S. PATENT DOCUMENTS

| | | | |
|---|---|---|---|
| 5,438,649 A | 8/1995 | Ruetz | |
| 6,724,507 B1 * | 4/2004 | Ikegami | ............... H04N 1/6058 358/501 |
| 7,457,003 B1 | 11/2008 | Marcu et al. | |
| 2006/0262224 A1 | 11/2006 | Ha et al. | |
| 2009/0021809 A1 | 1/2009 | Ramanath | |
| 2009/0040154 A1 | 2/2009 | Scheibe | |

(Continued)

OTHER PUBLICATIONS

Kang, *Computational Color Technology*, "Chapter 5: CIE Color Spaces," SPIE Press Monograph, vol. PM159, pp. 57-76, 2006.

(Continued)

*Primary Examiner* — Barry Drennan
*Assistant Examiner* — Schiller Hill
(74) *Attorney, Agent, or Firm* — Seed IP Law Group LLP

(57) ABSTRACT

Color images designed to be displayed, for example, with a projector such as a laser pico projector, are subjected to gamut extension in respective iso-hue paths in the CIE1931xyY color space, operating for example, as follows: a plurality of iso-hue curves in the CIE1931xyY color space is determined; for the points subjected to gamut extension, the closest iso-hue curves are identified; and extension paths to be used for the operation of gamut extension are interpolated from said closest iso-hue curves.

31 Claims, 13 Drawing Sheets

(56) References Cited

U.S. PATENT DOCUMENTS

| | | | | |
|---|---|---|---|---|
| 2011/0013208 A1* | 1/2011 | Bhaskaran | ........... | H04N 1/6027 358/1.9 |
| 2011/0187735 A1* | 8/2011 | Kondoh | ............... | G09G 3/2003 345/589 |
| 2011/0199541 A1* | 8/2011 | Fujine | ...................... | G09G 5/02 348/577 |
| 2012/0194539 A1* | 8/2012 | Zhang | .................. | G09G 3/3607 345/590 |

OTHER PUBLICATIONS

Kerr, "The CIE XYZ and xyY Color Spaces," Issue 1, Mar. 21, 2010.

Liu et al., "A Hue-preserving Gamut Expansion Algorithm in CIELUV Color Space for Wide Gamut Displays," $3^{rd}$ International Congress on Image and Signal Processing (CISP 2010), pp. 2401-2404, 2010.

Song et al., "A Gamut Expansion Algorithm Based on Saturation for Wide-gamut Displays," International Conference on Multimedia Technology (ICMT), Oct. 29-31, 2010, Ningbo, pp. 1-3.

Song et al., "A Gamut Extension Algorithm based on RGB Space for Wide-gamut Displays," IEEE $13^{th}$ International Conference on Communication Technology (ICCT), Sep. 25-28, 2011, Jinan, pp. 743-746.

Taplin et al., "When Good Hues Go Bad," Second European Conference on Color in Graphics, Imaging and Vision (CGIV 2004), pp. 348-352, 2004.

\* cited by examiner

| | 1 | 2 | 3 | 4 | 5 | 6 | 7 | 8 |
|---|---|---|---|---|---|---|---|---|
| 1 | – | – | – | – | – | – | – | – |
| 2 | – | – | – | – | V↔ | V↔ | V↔ | – |
| 3 | – | – | H↔ | H↔ | V↔ / H↔ | H↔ | H↔ | – |
| 4 | – | – | H↔ | H↔ | V↔ / H↔ | H↔ | – | – |
| 5 | – | – | – | V↔ | V↔ | V↔ | H↔ | – |
| 6 | – | – | – | V↔ | V↔ | V↔ | – | – |
| 7 | – | – | – | – | V↔ | V↔ | – | – |
| 8 | – | – | – | – | – | – | – | – |

FIG. 7

METHOD AND SYSTEM FOR CHROMATIC GAMUT EXTENSION, CORRESPONDING APPARATUS AND COMPUTER PROGRAM PRODUCT

BACKGROUND

Technical Field

The present description relates to techniques for providing gamut extension in the display of color images.

One or more embodiments can find application in devices that can be used for reproducing images, for example, in projectors such as the so-called "laser pico projectors."

Description of the Related Art

The continuous development of image-display devices (the term images is here to be understood as referring indifferently both to fixed images and to images/frames of video sequences) has led to providing devices able to display a gamut that is wider than the one provided by the input sources.

This applies, for example, when latest-generation display devices (displays and/or projectors) are used in conjunction with sources of image signals of a less advanced type (legacy images). Once again by way of example, whereas wide-gamut reproduction devices can use an adobeRGB color space, there exist projectors, for example laser projectors, which enable display of color gamuts that are even wider.

The possibility of displaying images with a certain gamut (sRGB, aRGB) with devices that are able to reproduce a wider gamut enables more saturated colors to be obtained, with the possibility of displaying an image that is more attractive to the eye. Achieving this result consequently implies "inventing" additional colors, at the same time preventing artifacts, such as banding, false colors, and hue shift in the final image.

For example, proposed in Y. Liu, et al.: "A Hue-preserving Gamut Extension Algorithm in CIELUV Color Space for Wide Gamut Displays", 2010 3rd International Congress on Image and Signal Processing (CISP 2010), 2401-2404, is a method of gamut extension that uses cube roots, for transformations in LUV space. On the other hand, it is to be noted that the LUV space may prove deficient in terms of perceptive uniformity.

In Song Gang, et al.: "A Gamut Extension Algorithm based on RGB Space for Wide-gamut Displays", IEEE 13th International Conference on Communication Technology (ICCT), 2011 a solution is proposed that operates in the RGB space (hence a space not perceptively uniform) that seeks to minimize the errors that derive therefrom via a boosting function calculated on the basis of the hue.

In order to prevent color artifacts, such as for example hue shift, a possible strategy may be to perform gamut extension in a color space that is perceptively uniform such as the LCh color space. Operating in the LCh color space may, however, prove burdensome from the computational standpoint.

It has been noted that it is possible to prevent recourse to transformation in the LCh color space, for example with reference to the CIExyY 1931 color space. The character of non-perceptively uniform color space extends in itself also to the CIE 1931xyY color space, rendering gamut extension in this domain more complex.

In the paper by Gang Song, et al.: "A Gamut Extension Algorithm Based on Saturation for Wide-gamut Displays", International Conference on Multimedia Technology, vol. 12, 2010, 493-495, it is proposed to implement the process of gamut extension in the xyY domain moving along straight lines. This procedure entails, however, the risk of generating hue-shift artifacts when the operation of extension or boosting is carried out.

The criticality of these artifacts is acknowledged, for example, in L. A. Taplin et al.: "When Good Hues Go Bad", Munsell Color Science Laboratory Center for Imaging Science, Rochester Institute of Technology, Rochester, N.Y.

BRIEF SUMMARY

In an embodiment, a method extends the chromatic gamut of color images along respective extension paths in a color space passing through the points subjected to color gamut extension, wherein said paths are iso-hue extension paths in the CIE1931xyY color space. In an embodiment, the method comprises determining a plurality of iso-hue curves in the CIE1931xyY color space, identifying, for the points subjected to chromatic gamut extension, the closest iso-hue curves out of said plurality of iso-hue curves, and interpolating from said closest iso-hue curves extension paths for said chromatic gamut extension. In an embodiment, the method comprises partitioning said CIE1931xyY color space into a grid of cells, locating, for the points subjected to chromatic gamut extension, the intersections of the horizontal and vertical lines passing through the point subjected to chromatic gamut extension and the set of iso-hue curves passing through the cell of the grid where the point is located, and selecting, as said closest iso-hue curves, the iso-hue curves whose intersections are closest to the point subjected to chromatic gamut extension. In an embodiment, said closest iso-hue curves are sampled by points, and the method includes: identifying a first pair and a second pair of points closest to the point subjected to extension on the one and the other of said closest iso-hue curves, respectively, calculating a first point and a second point of intersection between the vertical line passing through the point subjected to chromatic gamut extension and the one and the other of the segments between the points of said first pair and said second pair of points, respectively, calculating an interpolated extension path for the chromatic gamut extension of said point as a parametric curve passing through said point in the form:

$$y_m = (1-t)y_2 + ty_1$$

where $y_m$, $y_1$ and $y_2$ are coordinates of said point subjected to chromatic gamut extension, said first point of intersection and said second point of intersection, wherein $$t = (y_m - y_2)/(y_1 - y_2)$$

is an extension parameter. In an embodiment, the method includes calculating said extension paths by:

a) non-compensated interpolation:

$$x_1(k) = (1-t') \cdot x_2(k) + t' \cdot x_1(k)$$

$$y_1(k) = (1-t') \cdot y_2(k) + t' \cdot y_1(k),$$

and b) compensated interpolation:

$$x_1(k) = (1-t_{ec}) \cdot x_2(k) + t_{ec} \cdot x_1(k)$$

$$y_1(k) = (1-t_{ec}) \cdot y_2(k) + t_{ec} \cdot y_1(k)$$

where $x_1(k)$, $y_1(k)$, $x_2(k)$, $y_2(k)$ are the coordinates, of said first point and second point of intersection, respectively, referred to the k-th sample of said sampling by points, $t_{ec} = [(y_m + \delta_E) - y_2]/(y_1 - y_2)$, and $\delta_E = abs(y_m - y_{intercept})$ is the error associated to said non-compensated interpolation, with abs denoting absolute value and $y_{intercept}$ being the y coordinate of the effective intersection point of the correct interpolation curve and t', $t_{ec}$ are respective extension parameters. In an embodiment, said iso-hue extension paths in the CIE1931xyY color space are sampled by points, the method including: locating, for the points subjected to chromatic gamut extension, two points over the respective iso-hue extension path which are closest to the point subjected to chromatic gamut extension, said iso-hue path being expressed in parametric form as $C_x(t), C_y(t)$ with values of the parameters $t_1, t_2$ such that $C_x(t_1)=x_1$ and $C_x(t_2)=x_2$, with $t_{mpos}(x_m-x_1)/(x_2-x_1)$, where $x_m$, $x_1$ and $x_2$ are coordinates of the point ($P_m$) subject to chromatic gamut extension and said two closest points, respectively, using for said extension parameter an initial value $t_{start}$ equal to $t_i+t_{mpos}$ with i=1, 2 and an end value $t_{end}$ equal to $t_{start}+(t_{start} \cdot t_{boost})$ wherein $t_{boost}$ is an extension parameter. In an embodiment, the method includes: locating, over the respective iso-hue extension path, four points around the point subjected to chromatic gamut extension defined as:

$x_1 = C_x(\text{endpoint}_1)$ $y_1 = C_y(\text{endpoint}_1)$ $x_2 = C_x(\text{endpoint}_2)$ $y_2 = C_y(\text{endpoint}_2)$ where:
  endpoint$_1 = \lfloor t_{end} \rfloor$
  endpoint$_2 = \lceil t_{end} \rceil$
calculating the distance $\xi = t_{end} - \lfloor t_{end} \rfloor$ calculating the coordinates $x_b$, $y_b$ deriving from the extension as:

$x_b = (1-\xi) \cdot x_1 + \xi \cdot x_2$ $y_b = (1-\xi) \cdot y_1 + \xi \cdot y_2$.

In an embodiment, said iso-hue curves/paths are defined in the LCh or Lab color space and transformed to the CIE1931xy color space. In an embodiment, the method includes performing said chromatic gamut extension along said iso-hue paths in the CIE1931xyY color space, with extension or boosting factors selected from: a single, preferably selectable, boosting factor for all colors, different boosting factors for different iso-hue paths. In an embodiment, the method includes performing said chromatic gamut extension along said iso-hue paths in the CIE1931xyY color space, with extension or boosting factors selected by: avoiding clipping effects, allowing a certain amount of clipping. In an embodiment, the method includes avoiding clipping effects over at least one of said extension paths by: defining a chromatic gamut boundary before chromatic gamut extension, defining a chromatic gamut boundary after chromatic gamut extension, using a chromatic gamut extension parameter $t^\partial_{boost}$ $t^\partial_{boost} = (t^L_{max} - t^s_{max})/t^s_{max}$ wherein $t^s_{max}$ and $t^L_{max}$ are the values along said at least one of said extension paths exiting said chromatic gamut boundary before chromatic gamut extension and said chromatic gamut boundary after chromatic gamut extension, respectively. In an embodiment, the method includes performing said color gamut extension with different clipping values for different iso-hue extension paths. In an embodiment, the method includes subjecting said color images to at least one set of processing operations selected from: conversion to a RGB format before said chromatic gamut extension; conversion to a XYZ format and conversion to a xyY format before said chromatic gamut extension with subsequent complementary conversions after said chromatic gamut extension; linearization, preferably through gamma decoding, before said chromatic gamut extension with complementary processing, preferably by gamma encoding, after said chromatic gamut extension.

One or more embodiments may also refer to a corresponding system, as well as to a corresponding apparatus (for example, an apparatus for the reproduction of color images) and/or to a corresponding computer program product, which can be loaded into the memory of at least one computer and comprises portions of software code for implementing the steps of one or more embodiments of methods described herein when the product is run on a computer. As used herein, reference to a computer program product is equivalent to reference to a computer-readable means that contains instructions for controlling a processing system so as to co-ordinate execution of a method. Reference to "at least one computer" is intended to highlight the possibility of a modular or distributed form.

One or more embodiments may implement gamut extension by operating on iso-hue paths in the CIE1931xyY color space.

One or more embodiments may facilitate preventing or at least minimizing onset of hue-shift artifacts. These artifacts may be detected by the human eye, in particular in relation to the so-called memory-colors, e.g., the colors of objects (for example the skin, foliage, sky, etc.) that are well known, so that a hue-shift artifact on these objects may be easily identified.

Minimizing artifacts of this nature when working in a perceptively quasi-uniform space (for example, LUV) may come up against the need of supplying complex calculations (e.g., the calculation of cube roots), which militates against the possibility of operating in real time. In one or more embodiments, the process of construction of the iso-hue curves may be performed just once, for example passing through a Lab or LCh space that is perceptively more uniform than the LUV space.

One or more embodiments may take into account the fact that, when one moves in perceptively uniform spaces, there may even arise the need to manage complex transformations to get to these spaces and then return to the co-ordinates (for example, RGB) normally used by a display device, thus carrying out complex arithmetical operations. One or more embodiments may facilitate managing the non-linearity of the xyY space moving in this space in a non-uniform way (but in a simple way, by means of linear operations) and compensating the non-linearities.

One or more embodiments may facilitate one or more of the following:
  processing is performed using (quasi) linear transformations;
  it is possible to follow an iso-hue path in a practically exact way, e.g., with minimal error; and
  the corresponding solution may be applied to any type of wide-band device.

In an embodiment, a method comprises: identifying, for points in a color image subjected to chromatic gamut extension, closest iso-hue curves of a plurality of determined iso-hue curves in a CIE1931xyY color space; and interpolating, from the identified closest iso-hue curves of the plurality of iso-hue curves, extension paths for chromatic gamut extension, the interpolating including: partitioning the CIE1931xyY color space into a grid of cells; locating, for a point subjected to chromatic gamut extension, intersections of horizontal and vertical lines passing through the point subjected to chromatic gamut extension and a set of iso-hue curves of the plurality of determined iso-hue curves passing through the cell of the grid where the point is located; and selecting, as the closest iso-hue curves, iso-hue curves whose intersections are closest to the point subjected to chromatic gamut extension. In an embodiment, said closest iso-hue curves are sampled by points and the interpolating comprises: identifying a first pair and a second pair of points closest to the point subjected to extension on the one and the other of said closest iso-hue curves, respectively; calculating a first point and a second point of intersection between the vertical line passing through the point subjected to chromatic gamut extension and the one and the other of the segments between the points of said first pair and said second pair of points, respectively; and calculating an interpolated extension path for the chromatic gamut extension of said point as a parametric curve passing through said point subjected to chromatic gamut extension. In an embodiment, an extension parameter t of the chromatic gamut extension is defined according to:

$$t = (y_m - y_2)/(y_1 - y_2)$$

where $y_m$, $y_1$ and $y_2$ are y coordinates of said point subjected to chromatic gamut extension, said first point of intersection and said second point of intersection. In an embodiment, the method comprises calculating said extension paths by one of:
a) non-compensated interpolation:

$$x_1(k) = (1-t') \cdot x_2(k) + t' \cdot x_1(k)$$

$$y_1(k) = (1-t') \cdot y_2(k) + t' \cdot y_1(k),$$

and
b) compensated interpolation:

$$x_1(k) = (1-t_{ec}) \cdot x_2(k) + t_{ec} \cdot x_1(k)$$

$$y_1(k) = (1-t_{ec}) \cdot y_2(k) + t_{ec} \cdot y_1(k)$$

where $x_1(k)$, $y_1(k)$, $x_2(k)$, $y_2(k)$ are the coordinates, of said first point and second point of intersection, respectively, of a k-th sample of said sampling by points, $t_{ec} = [(y_{m+}\delta_E) - y_2]/(y_1 - y_2)$, and $\delta_E = abs(y_m - y_{intercept})$ is the error associated to said non-compensated interpolation, with abs denoting absolute value and $y_{intercept}$ being the y coordinate of an effective intersection point of the interpolation curve and t', $t_{ec}$ are respective extension parameters. In an embodiment, said iso-hue extension paths in the CIE1931xyY color space are sampled by points, the method comprising: locating, for the points subjected to chromatic gamut extension, two points over the respective iso-hue extension path which are closest to the point subjected to chromatic gamut extension, said iso-hue path being expressed in parametric form as $C_x(t)$, $C_y(t)$ with values of the parameters $t_1$, $t_2$ such that $C_x(t_1) = x_1$ and $C_x(t_2) = x_2$, with $t_{mpos} = (x_m - x_1)/(x_2 - x_1)$, where $x_m$, $x_1$, $x_2$ are coordinates of the point ($P_m$) subject to chromatic gamut extension and said two closest points, respectively; and using for said extension parameter an initial value $t_{start}$ equal to $t_i + t_{mpos}$ with i=1, 2 and an end value $t_{end}$ equal to $t_{start} + (t_{start} \cdot t_{boost})$, wherein $t_{boost}$ is an extension parameter. In an embodiment, the method comprises: locating, over the respective iso-hue extension path, four points around the point subjected to chromatic gamut extension defined as:

$$x_1 = C_x(\text{endpoint}_1)$$

$$y_1 = C_y(\text{endpoint}_1)$$

$$x_2 = C_x(\text{endpoint}_2)$$

$$y_2 = C_y(\text{endpoint}_2)$$

where:
  endpoint$_1 = \lfloor t_{end} \rfloor$
  endpoint$_2 = \lceil t_{end} \rceil$ ;
  calculating the distance $$\xi = t_{end} - \lfloor t_{end} \rfloor \text{; and}$$

calculating the coordinates $x_b$, $y_b$ deriving from the extension as:

$$x_b = (1-\xi) \cdot x_1 + \xi \cdot x_2$$

$$y_b = (1-\xi) \cdot y_1 + \xi \cdot y_2.$$

In an embodiment, said iso-hue paths are defined in the LCh or Lab color space and transformed to the CIE1931xy color space. In an embodiment, the method comprises performing said chromatic gamut extension along said iso-hue paths in the CIE1931xyY color space, with boosting factors selected according to one of: selecting a single boosting factor for all colors from a plurality of boosting factors; and selecting different boosting factors for different iso-hue paths. In an embodiment, the method comprising performing said chromatic gamut extension along said iso-hue paths in the CIE1931xyY color space, with extension or boosting factors selected to reduce clipping effects. In an embodiment, the method comprises avoiding clipping effects over at least one of said extension paths by: defining a chromatic gamut boundary before chromatic gamut extension; defining a chromatic gamut boundary after chromatic gamut extension; using a chromatic gamut extension parameter $t^3_{boost}$ $$t^3_{boost} = (t^L_{max} - t^s_{max})/t^s_{max}$$

wherein $t^s_{max}$ and $t^L_{max}$ are the values along said at least one of said extension paths exiting said chromatic gamut boundary before chromatic gamut extension and said chromatic gamut boundary after chromatic gamut extension, respectively. In an embodiment, the method comprises performing said color gamut extension with different clipping values for different iso-hue extension paths. In an embodiment, the method comprises subjecting said color images to at least one set of processing operations selected from: conversion to a RGB format before said chromatic gamut extension; conversion to a XYZ format and conversion to a xyY format before said chromatic gamut extension with subsequent complementary conversions after said chromatic gamut extension; and linearization using gamma decoding, before said chromatic gamut extension with complementary processing, using gamma encoding, after said chromatic gamut extension.

In an embodiment, an apparatus comprises: one or more memories; and one or more processing devices configured to subject points in a color image to chromatic gamut extension by: identifying, for each point in the color image subjected to chromatic gamut extension, closest iso-hue curves of a plurality of determined iso-hue curves in a CIE1931xyY color space; and interpolating, from the identified closest iso-hue curves of the plurality of iso-hue curves, extension paths for chromatic gamut extension, the interpolating including: partitioning the CIE1931xyY color space into a grid of cells; locating, for a point subjected to chromatic gamut extension, intersections of horizontal and vertical lines passing through the point subjected to chromatic gamut extension and a set of iso-hue curves of the plurality of determined iso-hue curves passing through the cell of the grid where the point is located; and selecting, as the closest iso-hue curves, iso-hue curves having intersections closest to the point subjected to chromatic gamut extension. In an embodiment, said closest iso-hue curves are sampled by points and the interpolating comprises: identifying a first pair and a second pair of points closest to the point subjected to extension on the one and the other of said closest iso-hue curves, respectively; calculating a first point and a second point of intersection between the vertical line passing through the point subjected to chromatic gamut extension and the one and the other of the segments between the points of said first pair and said second pair of points, respectively; and calculating an interpolated extension path for the chromatic gamut extension of said point as a parametric curve passing through said point subjected to chromatic gamut extension. In an embodiment, an extension parameter t of the chromatic gamut extension is defined according to:

$$t=(y_m-y_2)/(y_1-y_2)$$

where $y_m$, $y_1$ and $y_2$ are y coordinates of said point subjected to chromatic gamut extension, said first point of intersection and said second point of intersection. In an embodiment, the one or more processing devices are configured to calculate said extension paths by one of:
a) Non-Compensated Interpolation:

$$x_1(k)=(1-t')\cdot x_2(k)+t'\cdot x_1(k)$$

$$y_1(k)=(1-t')\cdot y_2(k)+t'\cdot y_1(k),$$

and
b) compensated interpolation:

$$x_1(k)=(1-t_{ec})\cdot x_2(k)+t_{ec}\cdot x_1(k)$$

$$y_1(k)=(1-t_{ec})\cdot y_2(k)+t_{ec}\cdot y_1(k)$$

where $x_1(k)$, $y_1(k)$, $x_2(k)$, $y_2(k)$ are the coordinates, of said first point and second point of intersection, respectively, of a k-th sample of said sampling by points, $t_{ec}=[(y_{m+}\delta_E)-y_2]/(y_1-y_2)$, and $\delta_E=abs(y_m-y_{intercept})$ is the error associated to said non-compensated interpolation, with abs denoting absolute value and $y_{intercept}$ being the y coordinate of an effective intersection point of the interpolation curve and t', $t_{ec}$ are respective extension parameters. In an embodiment, said iso-hue extension paths in the CIE1931xyY color space are sampled by points, the method comprising: locating, for the points subjected to chromatic gamut extension, two points over the respective iso-hue extension path which are closest to the point subjected to chromatic gamut extension, said iso-hue path being expressed in parametric form as $C_x(t)$, $C_y(t)$ with values of the parameters $t_1$, $t_2$ such that $C_x(t_1)=x_1$ and $C_x(t_2)=x_2$, with $t_{mpos}=(x_m-x_1)/(x_2-x_1)$, where $x_m$, $x_1$, $x_2$ are coordinates of the point ($P_m$) subject to chromatic gamut extension and said two closest points, respectively; and using for said extension parameter an initial value $t_{start}$ equal to $t_i+t_{mpos}$ with i=1, 2 and an end value $t_{end}$ equal to $t_{start}+(t_{start}\cdot t_{boost})$, wherein $t_{boost}$ is an extension parameter. In an embodiment, the one or more processing devices are configured to: locate, over the respective iso-hue extension path, four points around the point subjected to chromatic gamut extension defined as:

$$x_1=C_x(endpoint_1)$$

$$y_1=C_y(endpoint_1)$$

$$x_2=C_x(endpoint_2)$$

$$y_2=C_y(endpoint_2)$$

where:
  $endpoint_1=\llcorner t_{end} \lrcorner$
  $endpoint_2=\ulcorner t_{end} \urcorner$ ;
calculating the distance $$\xi=t_{end}-\llcorner t_{end}\lrcorner ; \text{ and}$$

calculate the coordinates $x_b$, $y_b$ deriving from the extension as:

$$x_b=(1-\xi)\cdot x_1+\xi\cdot x_2$$

$$y_b=(1-\xi)\cdot y_1+\xi\cdot y_2.$$

In an embodiment, said iso-hue paths are defined in the LCh or Lab color space and transformed to the CIE1931xy color space. In an embodiment, the one or more processing devices are configured to perform said chromatic gamut extension along said iso-hue paths in the CIE1931xyY color space, with boosting factors selected according to one of: selecting a single boosting factor for all colors from a plurality of boosting factors; and selecting different boosting factors for different iso-hue paths. In an embodiment, the one or more processing devices are configured to perform said chromatic gamut extension along said iso-hue paths in the CIE1931xyY color space, with extension or boosting factors selected to reduce clipping effects. In an embodiment, the one or more processing devices are configured to avoid clipping effects over at least one of said extension paths by: defining a chromatic gamut boundary before chromatic gamut extension; defining a chromatic gamut boundary after chromatic gamut extension; using a chromatic gamut extension parameter $t^\partial_{boost}$ $$t^\partial_{boost}=(t^L_{max}-t^s_{max})/t^s_{max}$$

wherein $t^s_{max}$ and $t^L_{max}$ are the values along said at least one of said extension paths exiting said chromatic gamut boundary before chromatic gamut extension and said chromatic gamut boundary after chromatic gamut extension, respectively. In an embodiment, the one or more processing devices are configured to perform said color gamut extension with different clipping values for different iso-hue extension paths. In an embodiment, the one or more processing devices are configured to subject said color images to at least one set of processing operations selected from: conversion to a RGB format before said chromatic gamut extension; conversion to a XYZ format and conversion to a xyY format before said chromatic gamut extension with subsequent complementary conversions after said chromatic gamut extension; and linearization using gamma decoding, before said chromatic gamut extension with complementary processing, using gamma encoding, after said chromatic gamut extension.

In an embodiment, a system comprises: an input configured to receive color images; and image processing circuitry configured subject points in a color image to chromatic gamut extension by: identifying, for points in the color image subjected to chromatic gamut extension, closest iso-hue curves of a plurality of determined iso-hue curves in a CIE1931xyY color space; and interpolating, from the identified closest iso-hue curves of the plurality of iso-hue curves, extension paths for chromatic gamut extension, the interpolating including: partitioning the CIE1931xyY color space into a grid of cells; locating, for a point subjected to chromatic gamut extension, intersections of horizontal and vertical lines passing through the point subjected to chromatic gamut extension and a set of iso-hue curves of the plurality of determined iso-hue curves passing through the cell of the grid where the point is located; and selecting, as the closest iso-hue curves, iso-hue curves having intersections closest to the point subjected to chromatic gamut extension. In an embodiment, said closest iso-hue curves are sampled by points and the interpolating comprises: identifying a first pair and a second pair of points closest to the point subjected to extension on the one and the other of said closest iso-hue curves, respectively; calculating a first point and a second point of intersection between the vertical line passing through the point subjected to chromatic gamut extension and the one and the other of the segments between the points of said first pair and said second pair of points, respectively; and calculating an interpolated extension path for the chromatic gamut extension of said point as a parametric curve passing through said point subjected to chromatic gamut extension. In an embodiment, the image processing circuitry is configured to perform said chromatic gamut extension along said iso-hue paths in the CIE1931xyY color space, with extension or boosting factors selected to reduce clipping effects. In an embodiment, the system comprises a projector.

In an embodiment, a non-transitory computer-readable medium's contents configure a digital processing device to subject points in a color image to chromatic gamut extension processing, the processing comprising: identifying, for each point in the color image subjected to chromatic gamut extension, closest iso-hue curves of a plurality of determined iso-hue curves in a CIE1931xyY color space; and interpolating, from the identified closest iso-hue curves of the plurality of iso-hue curves, extension paths for chromatic gamut extension, the interpolating including: partitioning the CIE1931xyY color space into a grid of cells; locating, for a point subjected to chromatic gamut extension, intersections of horizontal and vertical lines passing through the point subjected to chromatic gamut extension and a set of iso-hue curves of the plurality of determined iso-hue curves passing through the cell of the grid where the point is located; and selecting, as the closest iso-hue curves, iso-hue curves having intersections closest to the point subjected to chromatic gamut extension. In an embodiment, said closest iso-hue curves are sampled by points and the interpolating comprises: identifying a first pair and a second pair of points closest to the point subjected to extension on the one and the other of said closest iso-hue curves, respectively; calculating a first point and a second point of intersection between the vertical line passing through the point subjected to chromatic gamut extension and the one and the other of the segments between the points of said first pair and said second pair of points, respectively; and calculating an interpolated extension path for the chromatic gamut extension of said point as a parametric curve passing through said point subjected to chromatic gamut extension. In an embodiment, the processing comprises performing said chromatic gamut extension along said iso-hue paths in the CIE1931xyY color space, with extension or boosting factors selected to reduce clipping effects.

BRIEF DESCRIPTION OF THE SEVERAL VIEWS OF THE DRAWINGS

One or more embodiments will now be described, purely by way of non-limiting example, with reference to the annexed drawings, wherein:

FIG. 7 is a table provided by way of example of signal processing in some embodiments;

DETAILED DESCRIPTION

In the ensuing description, various specific details are illustrated aimed at providing an in-depth understanding of various examples of embodiments. The embodiments may be provided without one or more of the specific details, or with other methods, components, materials, etc. In other cases, known structures, materials, or operations are not shown or described in detail so that the various aspects of the embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in various points of the present description do not necessarily refer to one and the same embodiment. Moreover, particular conformations, structures, or characteristics may be combined in any adequate way in one or more embodiments.

The references used herein are merely provided for convenience of the reader and hence do not define the sphere of protection or the scope of the embodiments.

Figure 1:
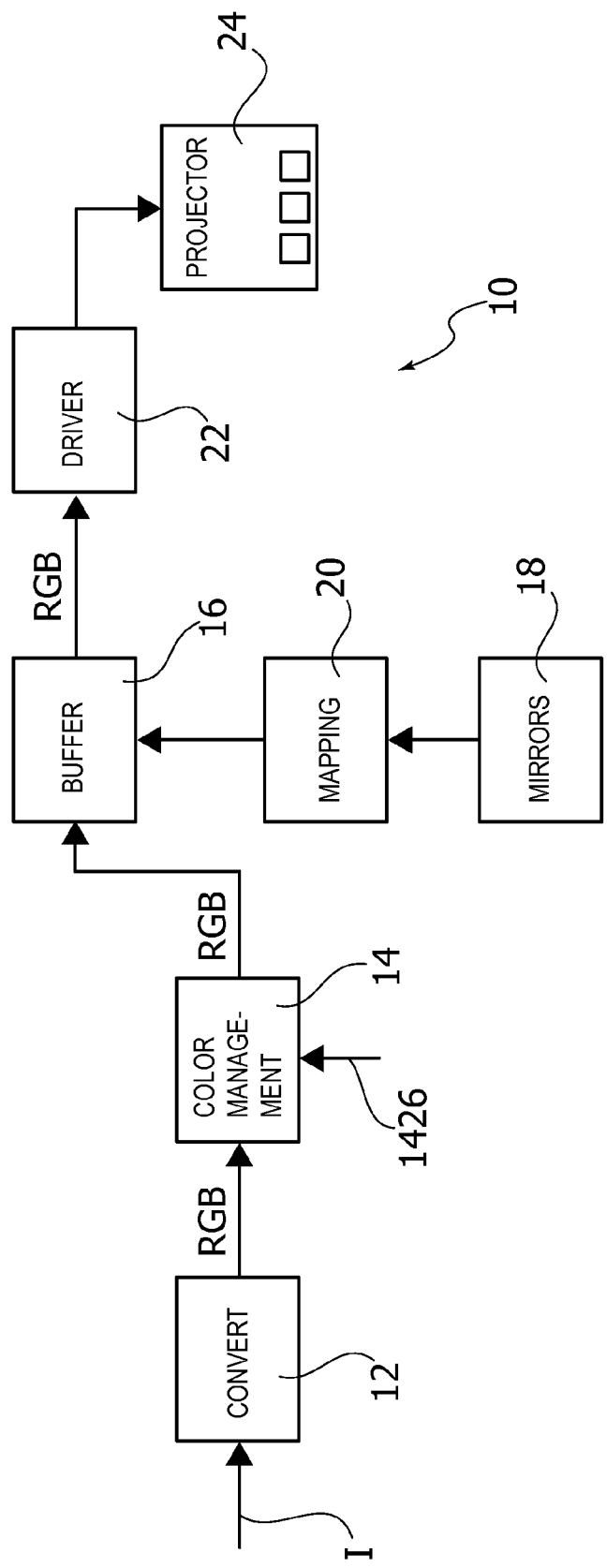
FIG. 1 is a block diagram of an apparatus incorporating a system according to embodiments.

The block diagram of FIG. 1 exemplifies the possible structure of an apparatus 10 that is able to operate according to one or more embodiments.

In one or more embodiments it may be an apparatus for the reproduction of (fixed or video) images such as, for example, a laser projector (e.g., a laser pico projector).

In the example considered herein, it is assumed that the apparatus 10 will receive at input images I, for example in the form of digital images in a color format such as RGB or YUV: of course, reference to these formats is provided merely by way of example.

The reference 12 designates a module/function/circuitry that is able to carry out, for example, conversion of the format of the images I at input into an RGB format. The presence of the module/function/circuitry 12 is, however, optional: if the input images I are already in formats such as sRGB or adobeRGB (or the like) the module/function/circuitry 12 is superfluous.

The signal corresponding to the images I, possibly converted in the module/function/circuitry 12, can be transferred to a color-management module/function/circuitry 14, in which it is possible to carry out the gamut-extension/boosting function according to the modalities illustrated more fully in what follows.

The signals (for example, in RGB format) coming from the module/function/circuitry 14 may be written in a frame buffer 16 with a view to their use for display (e.g., projection) of the image.

In the example presented herein (which is merely an example and hence in no way limits the scope of the embodiments), the device 10 is a projector, such as for example a raster-scanning projector that is able to operate on the basis of the co-ordinates of the pixels to be projected as a function of the position of the projection mirrors.

In one or more embodiments, there may hence be present a sub-system of the mirrors 18 that is able to supply the current position of the mirrors of the projector to a module/function/circuitry 20 for mapping the image co-ordinates so as to compute the co-ordinates x, y of the pixel of the frame buffer to be projected and locate, as a function of the co-ordinates (x, y) of the pixel to be projected, the triad RGB (or the like) to be projected.

In this way, it is thus possible to extract from the frame buffer 16 the triads to be projected, sending them to an LDD (Laser Driver DAC) module/function 22 containing the digital-to-analog converters that are to supply values of current for driving the lasers of the projection unit or projector proper, designated by 24.

Reference to a display device having the characteristics illustrated in the block diagram of FIG. 1 is to be understood as being merely an example. One or more embodiments can in fact be used in display devices of a different type—for example, displays (including printers) of various nature.

Figure 2:
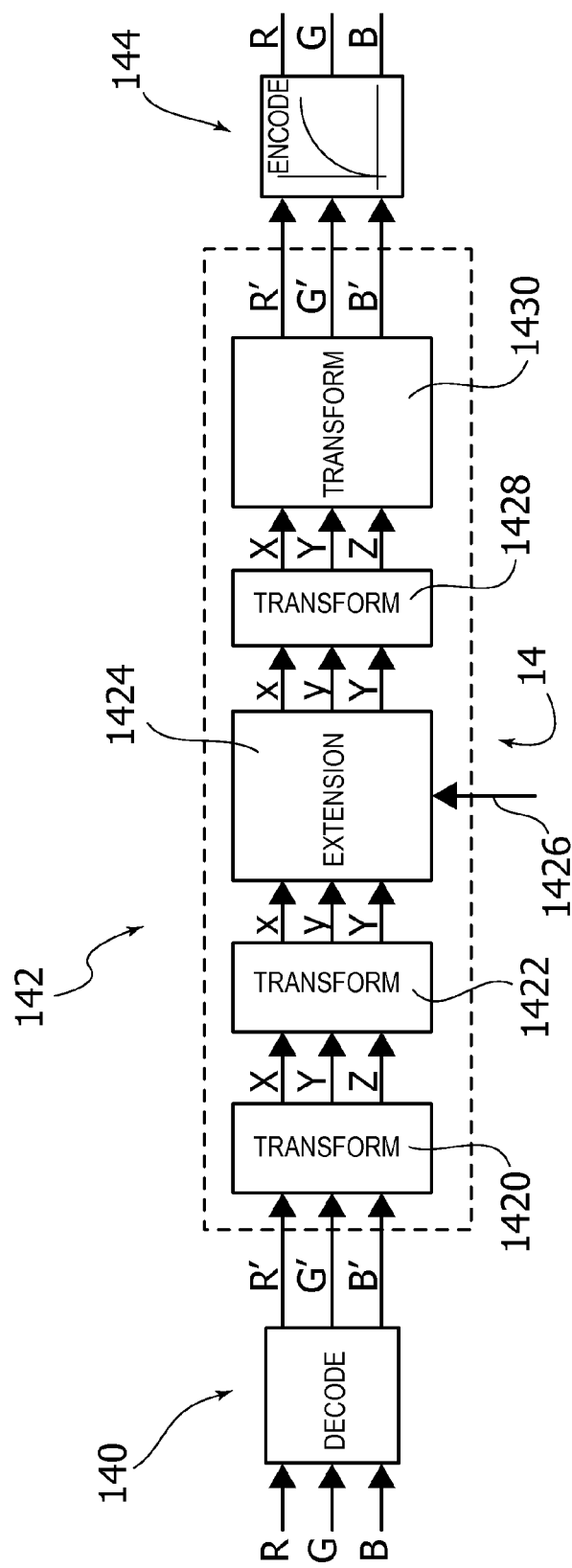
FIG. 2 is a block diagram in greater detail of part of FIG. 1.

The block diagram of FIG. 2 exemplifies possible embodiments of the color-management module/function/circuitry represented in FIG. 1 by block 14.

In the example shown in FIG. 2, the signals/data (e.g., RGB) at input to the module/function/circuitry 14 can be first linearized (for example, in a gamma-decoding module/function/circuitry 140) so as to perform the subsequent operations of transformation and color processing in a linear space.

The signals linearized in the module/function/circuitry 140 (which are designated in FIG. 2 by R', G', B') can be transmitted to a set of modules/functions/circuitry designated as a whole by 142.

The above set comprises two modules/functions/circuitry 1420, 1422 that transform the linearized data R', G', B' first in XYZ and then in xyY to transfer to a gamut-extension module/function/circuitry 1424.

The module/function/circuitry 1424 can receive on an input line 1426 the co-ordinates xy of the primary color components of the output device (for example, a projector 24). Possible criteria of operation of the module/function/circuitry 1424 will be illustrated in greater detail in what follows.

The signals in xyY format subjected to the process of gamut extension (which is able, as will be described more fully in what follows, to take into account the maximum gamut that can be represented by the output device on the basis of the co-ordinates xy of the three primary components of color of the output device) can be supplied to two modules/functions/circuitry 1428, 1430 that perform transformations from the xyY format to the XYZ format and again to the format R', G', B' that are complementary to the transformations performed by the modules/functions/circuitry 1420 and 1422.

The signals thus obtained can then be supplied to a module/function/circuitry 144, which is able to carry out a gamma encoding complementary to the decoding performed by the module/function/circuitry 140 to obtain signals (for example, in RGB format) that can be used for the purposes of display of the image. For example, with reference to the embodiment exemplified in FIG. 1, this can be obtained via supply to the frame buffer 16.

One or more embodiments resort to linear or quasi-linear operations, thus avoiding the complexity linked to transformations made in color spaces that are perceptively uniform such as Lab and LCh, with the possibility of operating in real time as in the case of a projector of video signals. One or more embodiments are suited, on the other hand, to being used in off-line mode, for example by saving the image in the format resulting from the gamut extension with a view to a subsequent use.

The various blocks exemplified previously have been presented as exemplifying modules/functions/circuitry, taking into account the fact that one or more embodiments are suited to being implemented at a hardware level (for example, operating in fixed-point arithmetic), or else with mixed software/hardware implementations, possibly in the form of a computer program product operating on processing hardware of a standard type.

Possible criteria of operation of one or more embodiments of the processing block designated as a whole by 142 in FIG. 2 will now be illustrated paying particular attention to the following two aspects:
  the identification of iso-hue paths in the xy space to be used for the purposes of gamut extension so as to minimize onset of artefacts; and
  the corresponding extension or boosting operation proper.

In one or more embodiments, the iso-hue paths that can be used for gamut extension may be obtained by interpolation starting from iso-hue curves.

Figure 4:
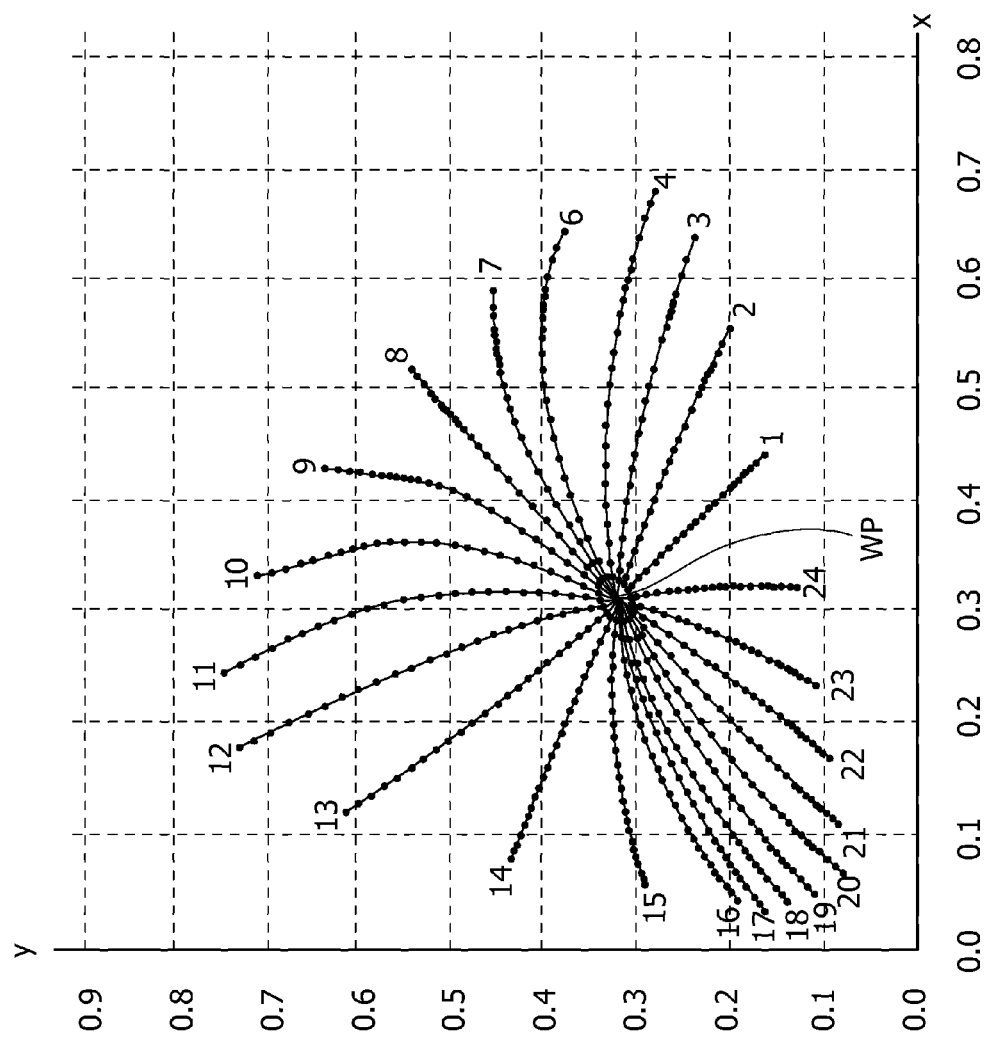

In one or more embodiments, the iso-hue curves/paths can be identified in the LCh or Lab space and transformed into the CIE1931xy color space as schematically represented in FIG. 4.

The CIE1931 color space has been defined in 1931 by the International Commission on Illumination (Commission International de l'Eclairage) in order to define a color space comprising all the hues visible by the human eye, in a way independent of the luminance. The CIE1931 model is based upon three primary colors, which enable all the colors to be obtained by additive synthesis, e.g., by mixing them together, and in a way independent of the behavior of the specific display device used.

Figure 3:
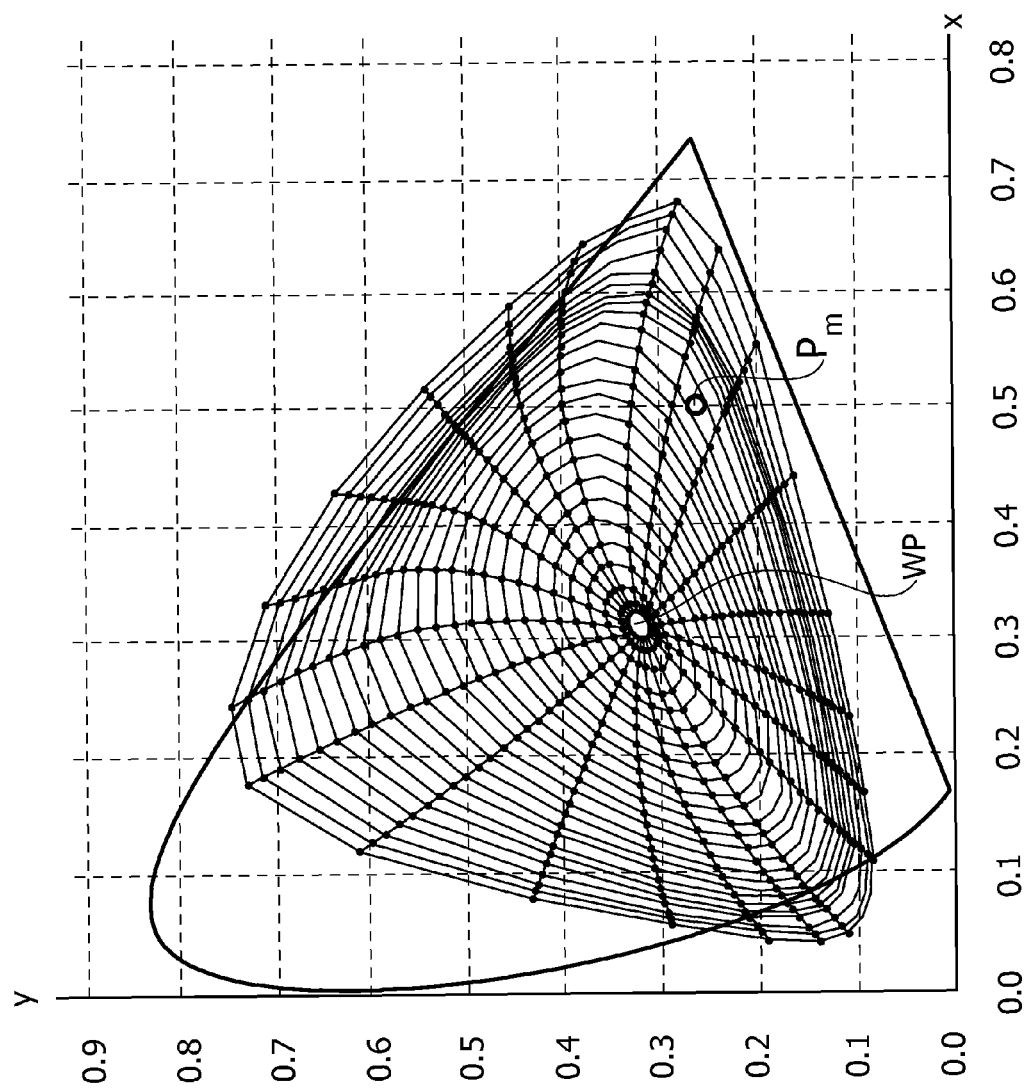
FIGS. 3 to 6 are graphs referring to the CIE1931 color space and illustrating the principles underlying some embodiments.

FIG. 3 exemplifies the fact that, in the CIE1931 representation, given any color $P_m$ with co-ordinates ($x_m$, $y_m$) in the xy domain, it is possible to define an iso-hue path that starts from the white point WP and that passes through $P_m$.

For example, it is possible to obtain iso-hue curves in the LCh or Lab domain by sampling (according to known criteria) the color space in iso-hue directions, e.g., with one and the same angle "h". For each hue it is possible to sample different chromatic values, and each of the samples obtained can be transformed into the corresponding element in the CIE1931 xy domain.

Considering the perceptively non-uniform nature of the CIE1931xy space, the transformed samples are distributed in non-linear paths, as exemplified precisely in FIGS. 3 and 4.

As compared to FIG. 3, FIG. 4 brings out more clearly (in the two-dimensional space xy of the CIE1931 system) a certain number N of iso-hue curves defined, for example, in the LCh (or Lab) space and transformed into the CIE 1931 space. FIG. 4 refers, by way of example, to a number N of iso-hue curves equal to 24 (N=24).

Various embodiments may, however, use a different number of iso-hue curves and/or different iso-hue curves: this fact is highlighted in FIGS. 3 to 6, where different iso-hue curves are represented.

In the present description of examples of embodiments, it may be assumed that each iso-hue curve is sampled on a certain number K of samples, for example K=75. One or more embodiments may evidently use different values.

In this regard, it is once again recalled that the definition of a certain number of iso-hue curves transformed into the CIE 1931xy space may be made according to criteria known in the art.

For example, in one or more embodiments, it is possible to transform, for example, 24 hues (which in the LCh space are straight) into the Lab space (transformation with known equations). From the Lab space, once again following known transformations, we arrive at the XYZ space; finally, once again via known equations, we arrive at the xy space, with a processing chain LCh->Lab->XYZ->xy, which may, for example, comprise steps such as:

from LCh to Lab
from Lab to XYZ
from XYZ to xy with the last space ("xy") corresponding to the domain in which the extension or boosting operation is carried out.

In one or more embodiments it may hence be the result of three transformations between color spaces, each of these transformations being carried out by applying known equations.

For example, for the transformation from LCh to Lab reference may be made to the known formulas.

For the transformation from Lab to XYZ reference may be made, for example, to Henry R. Kang, "Computational Color Technology", (SPIE Press Monograph Vol. PM159), 2006, p. 62.

Finally, the transformation from XYZ to xy may be a normalization with respect to the sum of the components, as described, for example, on page 10 of the document by Douglas A. Kerr: "The CIE XYZ and xyY Color Spaces", Issue 1, Mar. 21, 2010.

In one or more embodiments, the iso-hue paths (however determined) may prove not expressible in the xy space of the CIE1931 system with a function of the type y=f(x), in particular with a simple representation in polynomial terms.

In one or more embodiments, in order to determine the iso-hue path that starts from the white point WP and passes through a given point $P_m$ of the color space (point corresponding to the color of which it is desired to carry out gamut extension), it is possible to proceed by interpolation starting from the two closest iso-hue curves, for example, from the two iso-hue curves that "enclose" the point $P_m$.

Figure 5:
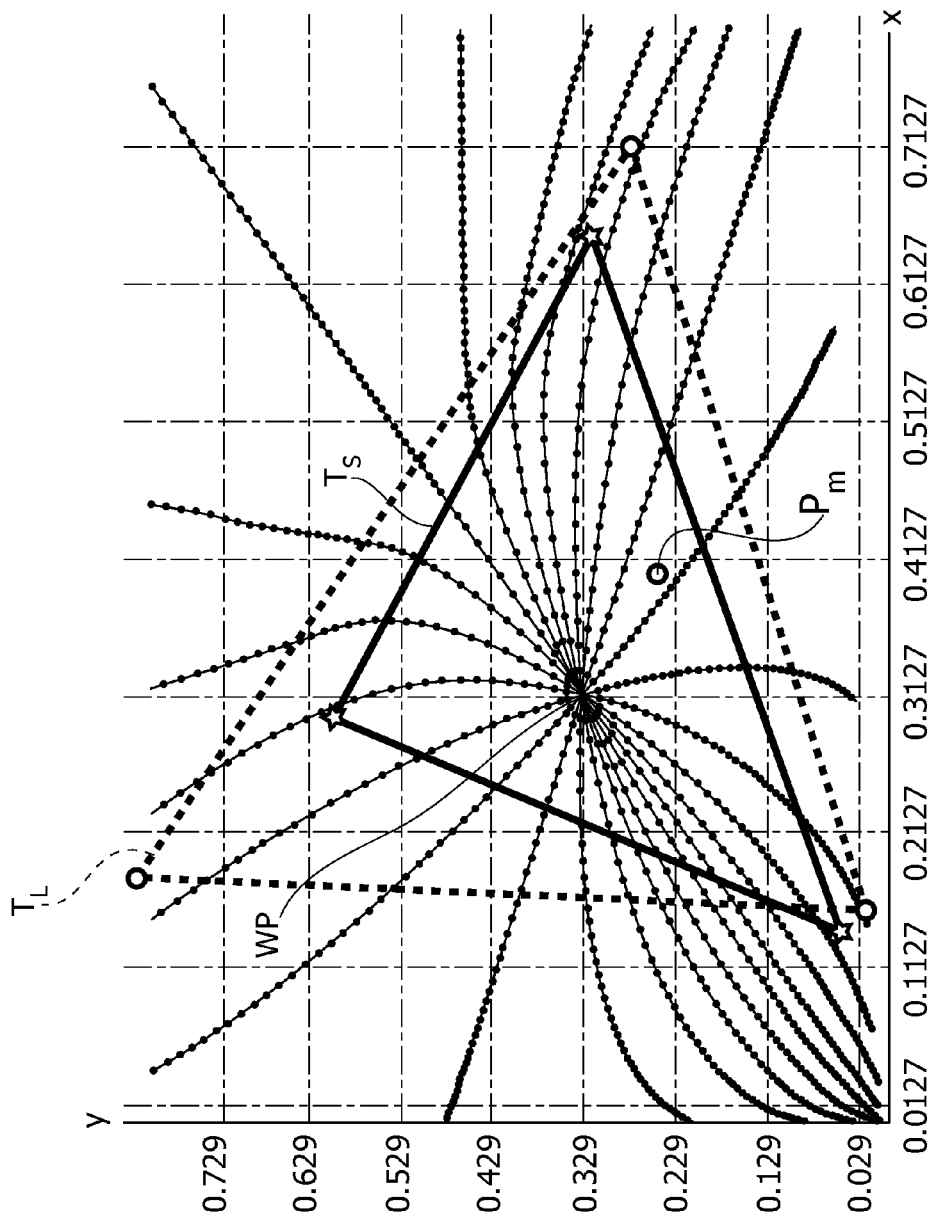

In one or more embodiments, this action of location of the two iso-hue curves closest to a given color (x, y) represented by the point $P_m$ may be implemented by dividing the xy space according to the cells of a grid represented with a dashed line in FIG. 5.

In one or more embodiments, the grid can be defined in such a way that the white point WP is located at the intersection of two lines that define the grid so as to correspond to a vertex point of four adjacent cells of the grid. Even though it is not in any way an imperative choice, in what follows it will be assumed for simplicity that the cells of the grid have a rectangular shape and the same dimensions.

In one or more embodiments, in order to identify potentially adjacent iso-hue curves it is possible to proceed by identifying in which cell of the grid the point $P_m$ that is undergo gamut extension is located.

It will on the other hand be appreciated that the ensuing treatment refers to the case (which is by far the most likely) where the point $P_m$ is not located on any of the iso-hue curves. In the case where the point $P_m$ is located on one of the iso-hue curves, this curve can be directly used as extension path, skipping the operations of interpolation described in detail in what follows and passing directly to the step of extension or boosting proper described with reference to FIGS. 10 to 14. In other words, in the case where the point $P_m$ is located on one of the iso-hue curves, the operations of interpolation amount to the pure identification, as extension path, of the iso-hue curves passing through the point itself.

Figure 6:
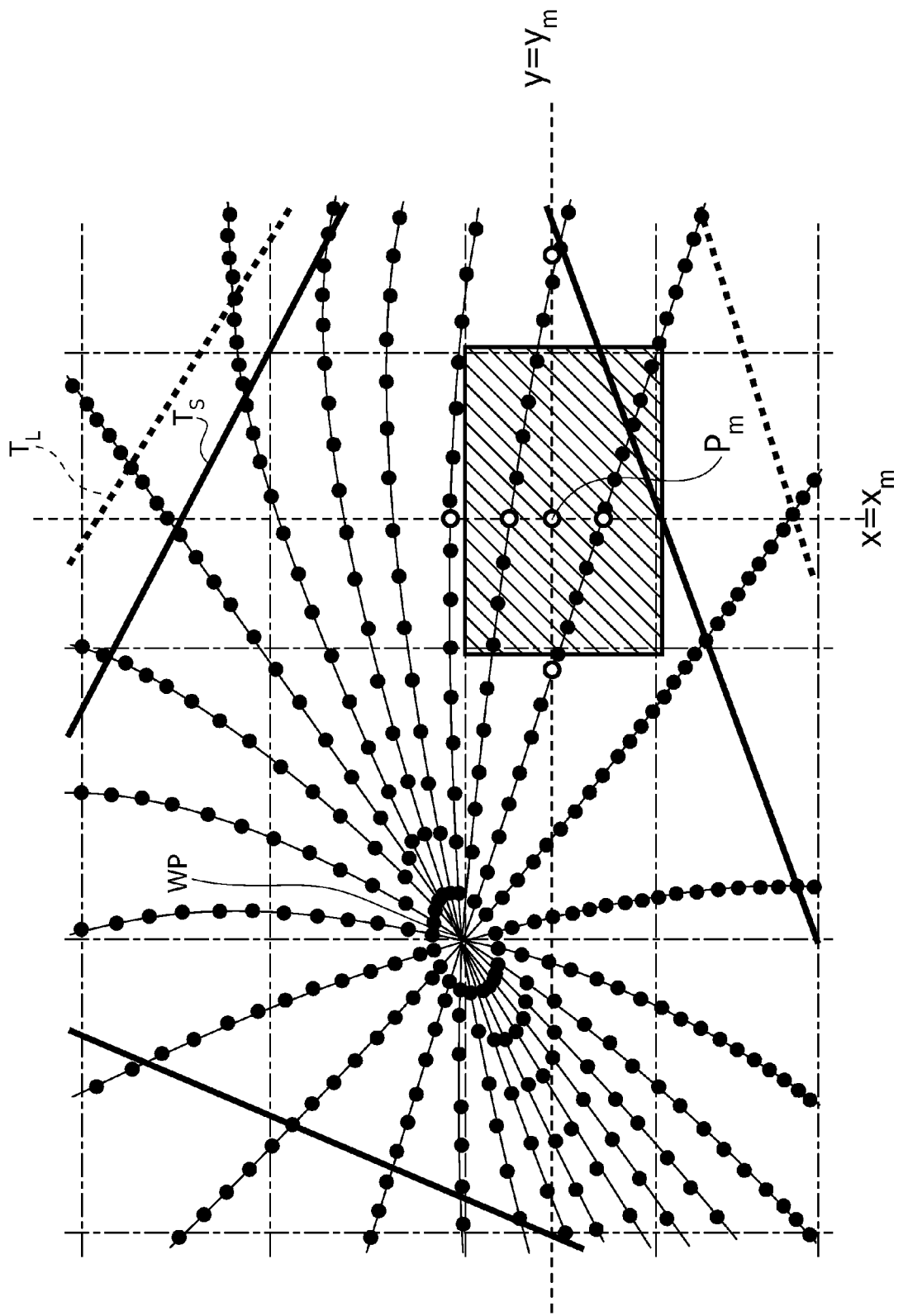

For example, FIG. 6 is an enlarged representation of a part of the plane xy of the CIE1931 system adjacent to the white point WP where there may be noted, by way of example, a point $P_m$ (with co-ordinates $x=x_m$ and $y=y_m$) located in a cell traversed by two iso-hue curves, with another two iso-hue curves that pass just outside the cell.

In one or more embodiments, it is possible to proceed by identifying the intersections between the horizontal line ($y=y_m$) and the vertical line ($x=x_m$) that pass through the point $P_m$ and the set of curves passing through the cell of the grid in which the point $P_m$ is located. It is then possible to select the horizontal and vertical intersections (HN), identify the curves closest to the point $P_m$, and "label" the intersections with the numbers of the curves in question so as to locate the two curves closest to $P_m$ via the two intersections closest to $P_m$.

The table of FIG. 7 exemplifies how this can be obtained in one or more embodiments. In particular, the rows and the columns of the table identify the cells of the grid, and the vertical or horizontal intersections are obtained as indicated by the double-headed arrows.

In the table, the symbol H expresses the fact that, to identify the two adjacent curves, only the horizontal intersection is made (intersection of the straight line $y=y_m$ with the curves that pass through the cell in which the point $P_m$ is located). The symbol V expresses the fact that to seek the adjacent curves only the vertical intersection is made (intersection of the straight line $x=x_m$ with the curves that pass through the cell in which the point $P_m$ is to be found). The point or circle at the center of the table represents the White Point WP.

In one or more embodiments, it is possible to proceed by locating the minimum of the distances greater than zero and the maximum of the distances smaller than zero, and (assuming that the iso-hue curves are numbered in an orderly way) the numbers of the curves associated to the two distances identify the two iso-hue curves that embrace the point/sample $P_m$, which are closest thereto.

Figure 8:
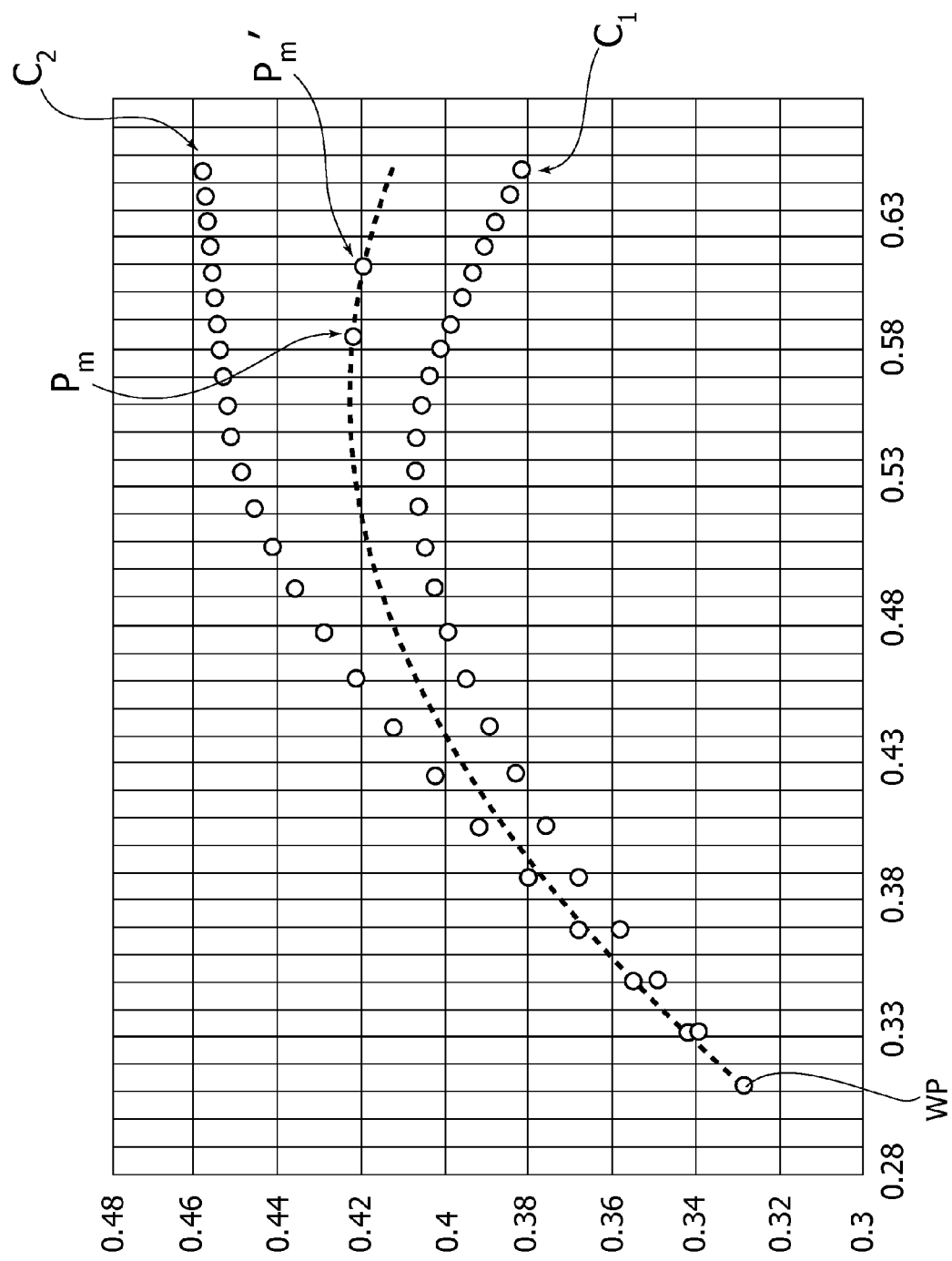
FIGS. 8 to 10 illustrate examples of signal processing in some embodiments.

This procedure enables identification of the two iso-hue curves closest to the point $P_m$, designated by $C_1$ and $C_2$ in the representation of FIG. 8. Starting from these curves, it is possible to interpolate an iso-hue path (represented dashed in FIG. 8) in which it is possible to carry out chromatic gamut extension by "mapping" the point $P_m$ in a new point $P'_m$, resulting from the action of extension and designed to be used for display. For example, the point $P'_m$ can be supplied to the frame buffer 16 in the scheme provided by way of example in FIG. 1.

In carrying out an interpolation aimed at identifying a path along which to implement the action of gamut extension or boosting various factors may be taken into account, for instance:

the samples of the curves (e.g., $C_1$ and $C_2$) used for the purposes of interpolation may be found not to be aligned vertically in the plane xy;
the distances between samples, whether it is the distance between adjacent samples within one and the same curve (intra-curve samples) or the distance between the pairs of samples closest to one another in the two curves (cross-curve samples) may not be uniform.

Figure 9:
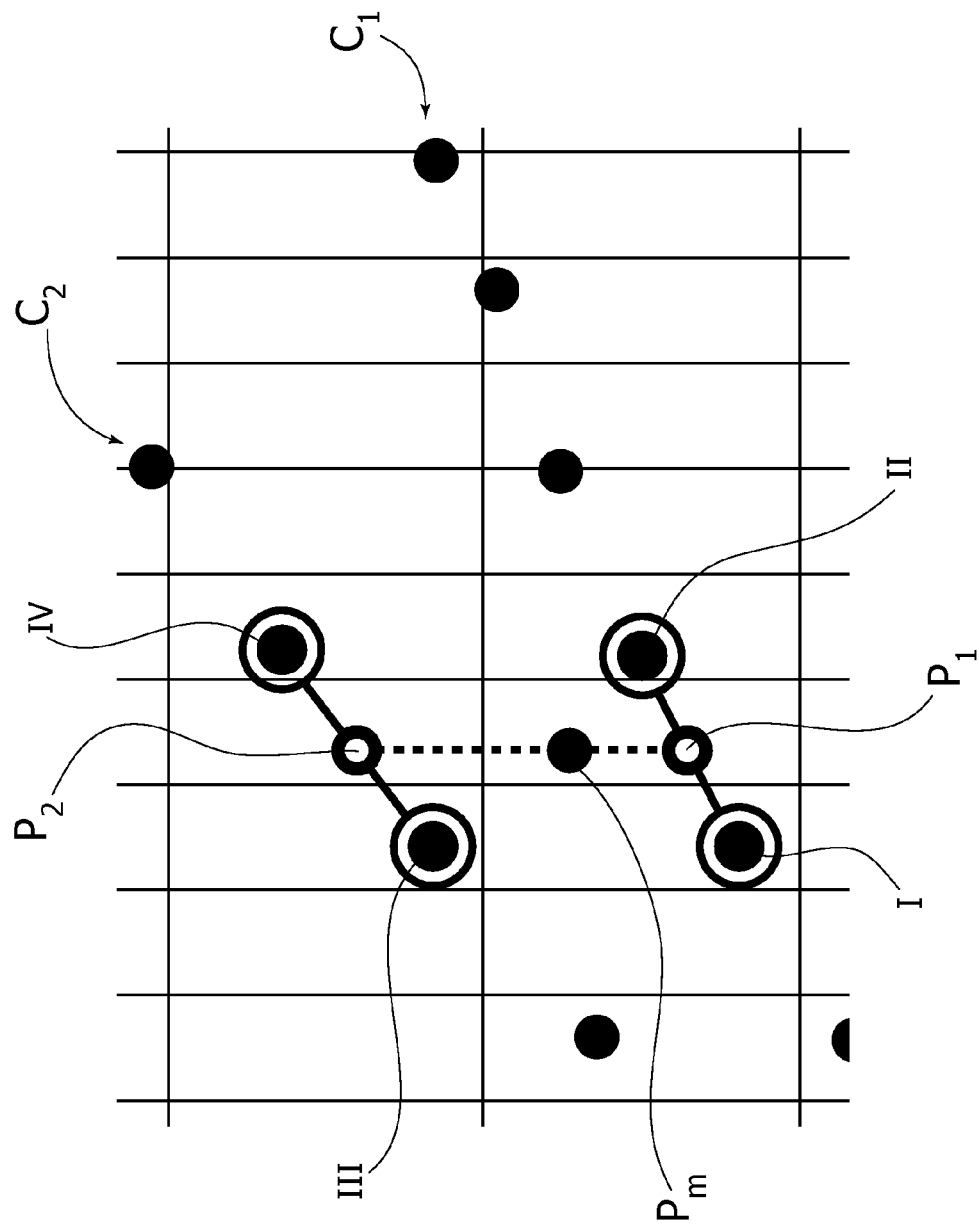

In one or more embodiments, it is possible to proceed as schematically represented in FIG. 9, e.g., identifying the four points I, II, III, and IV closest to the point $P_m$ (in the example represented herein, the points I and II on the curve $C_1$ and the points III, IV on the curve $C_2$) and then compute the points of intersection between the vertical line passing through $P_m$ and the segments that connect the points I, II, on one side, and the points III and IV, on the other. The corresponding points of intersection, designated respectively by $P_1$ (intersection with the segment that connects the points I and II) and $P_2$ (intersection with the segment that connects the points III and IV), will consequently present co-ordinates $(x_1, y_1)$ for $P_1$ and $(x_2, y_2)$ for $P_2$, with the co-ordinates $x_1$ and $x_2$ that are the same as one another and equal to the co-ordinates $x_m$ of the point $P_m$.

In this way, it is possible to define a curve passing through $P_m$ that can be expressed at $P_m$ in the form $$y_m = (1-t)y_2 + ty_1$$

where, in this case, t is the unknown $$t = (y_m - y_2)/(y_1 - y_2).$$

In one or more embodiments, it is thus possible to interpolate the "missing" path using samples already available between the two adjacent curves $C_1$, $C_2$.

In one or more embodiments, it is possible to apply an interpolation without compensation $$x_1(k) = (1-t') \cdot x_2(k) + t' \cdot x_1(k)$$

$$y_1(k) = (1-t') \cdot y_2(k) + t' \cdot y_1(k)$$

where t' is chosen equal to the value of t defined above. This operating procedure can lead to errors such as not to enable a correct interpolation at the first step in so far as an error may be generated $$\delta_E = abs(y_m - y_{intercept})$$

where abs indicates the absolute value, and $y_{intercept}$ indicates the co-ordinate y of the effective point of intersection of the correct interpolation curve.

In one or more embodiments, it is therefore possible to apply an interpolation with compensation $$x_1(k) = (1-t_{ec}) \cdot x_2(k) + t_{ec} \cdot x_1(k)$$

$$y_1(k) = (1-t_{ec}) \cdot y_2(k) + t_{ec} \cdot y_1(k)$$

with a compensated interpolation factor $t_{ec}$, where $t_{ec} = [(y_{m+} \delta_E) - y_2]/(y_1 - y_2)$.

In both cases k=1, ..., K identifies the number of the sample (previously reference was made to an example where K=72 samples are present).

In one or more embodiments, some particular cases of iso-hue paths may be taken into account, where the co-ordinates present a non-monotonic increasing/decreasing pattern (for example, instead of a pattern increasing in a monotonic way, a pattern in which the co-ordinate x first increases and then decreases). This behavior can affect the choice of the four closest points previously designated by I, II, III, and IV.

As indicated previously—once the iso-hue path along which to implement the action of extension has been determined (for example, via a mechanism of interpolation between adjacent iso-hue curves)—in one or more embodiments it is possible to pass from the pre-extension point, $P_m$, to the post-extension point, $P'_m$ ensuring that this new point lies in the extension path defined previously, for example, by interpolation.

In one or more embodiments, it is possible to proceed by treating separately each of the co-ordinates x(t) and y(t).

In one or more embodiments it is possible to operate in a parametric discrete domain, for example, as a function of the parameter t defined previously.

In one or more embodiments, the aim may hence be to shift the point $P_m$ "forwards" (e.g., away from the white point WP) along the extension path that passes through $P_m$ to reach a point $P_m'$ that represents the result of the extension.

It will consequently be appreciated (also with reference to the figures) that the departure from the white point WP in passing from the point $P_m$, with co-ordinates $x_m$, $y_m$, to the extended or boosted point $P_m'$, with co-ordinates $x_b$, $y_b$, can entail either an increase or a decrease of the abscissa and/or of the ordinate—according to the orientation of the extension path.

Also in order to be able to manage easily such a situation, in one or more embodiments, instead of working directly on the Cartesian co-ordinates $x_m$, $y_m$ of the point $P_m$, it is possible to operate in a parametric domain, for example, on the basis of a parameter such as t.

In what follows, mainly presented by way of example is the possibility of operating in this way on the value x of the abscissae (the case of the ordinate y may be treated in a similar way).

Figure 10:
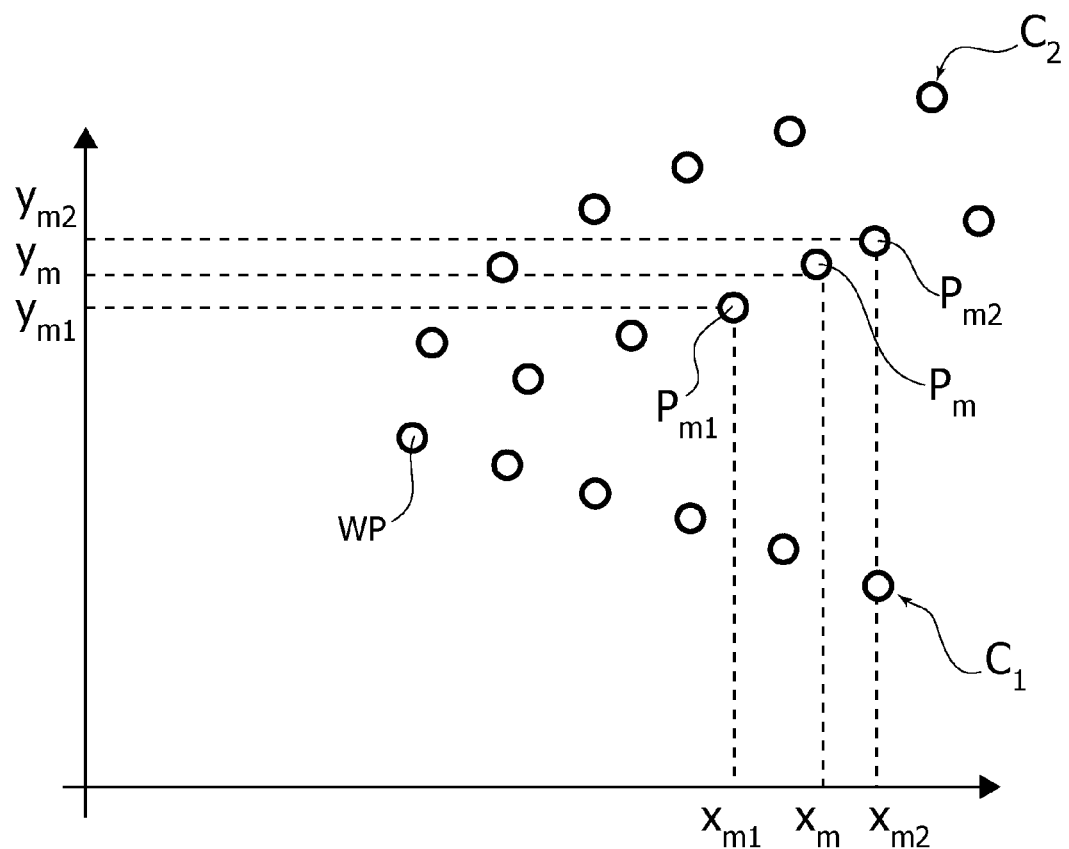

FIG. 10 shows that, in one or more embodiments, it is possible to locate two points $P_{m1}$ and $P_{m2}$ closest to the point $P_m$ to be extended that lie on the iso-hue path used for the extension.

In one or more embodiments, the two points $P_{m1}$ and $P_{m2}$ can be located by scanning the value x of the space of the interpolation path until co-ordinates are determined such that $x_1 < x_m < x_2$ or $x_2 < x_m < x_1$, according to the orientation of the extension path, by obtaining also the corresponding values y from the space of the y value.

For example, assuming that the iso-hue path used for the extension can be expressed in a parametric form as $(C_x(t), C_y(t))$ with values of the parameters $t_1$, $t_2$ such that $C_x(t_1) = x_1$ and $C_x(t_2) = x_2$, with $t_{mpos} = (x_m - x_1)/(x_2 - x_1)$, such that $0 \le t_{mpos} \le 1$, the initial value $t_{start}$ for the action of extension or boosting in the parametric space can be expressed as $$t_{start} = t_i + t_{mpos}$$

where i=1, 2: in the parametric domain it will be assumed that associated to $x_1$ is $t_1$ and associated to $x_2$ is $t_2$.

The extended or boosted point in the parametric domain that is to be reached is identified by the boosting parameter $t_{end}$, which can be expressed as $$t_{end} = t_{start} + (t_{start} \cdot t_{boost})$$

where the parameter $t_{boost}$ can be defined according to criteria described more fully in what follows.

In one or more embodiments, the values $t_{start}$ and $t_{end}$ may not exist in the sampled space of the interpolated curve (for which the sampled points may be designated as a whole by $t_1$, $t_2$, $t_3$, ... ). To this there corresponds the fact that, depending upon the value of $t_{boost}$, the co-ordinate $x_b$ of the "boosted" point could fall accordingly between $x_1$ and $x_2$, between $x_2$ and $x_3$, between $x_3$ and $x_4$, ... where by $x_3$, $x_4$, etc., are understood in general values that are further away from $x_2$ along the extension path.

It is then possible to define the values $$endpoint_1 = \lfloor t_{end} \rfloor$$

$$endpoint_2 = \lceil t_{end} \rceil$$

and identify four points along the extension path that surround the point subjected to extension or boosting so that for example, $$x_1 = C_x(\text{endpoint}_1)$$

$$y_1 = C_y(\text{endpoint}_1)$$

$$x_2 = C_x(\text{endpoint}_2)$$

$$y_2 = C_y(\text{endpoint}_2)$$

and, for example, it is possible to have $\text{endpoint}_1 = t_2$ and $\text{endpoint}_2 = t_3$, with $x_b$ that is between $x_2$ and $x_3$ in so far as $t_2$ and $t_3$ have been obtained.

Wishing to know for example how far $x_b$ departs from $x_2$ it is possible to compute (once again operating in the parametric domain) the distance $$\xi = t_{end} - ^L t_{end}^J$$

finally obtaining, with reference for simplicity to two extremes called simply $x_1$ and $x_2$, the co-ordinates deriving from boosting in the space of the values as follows $$x_b = (1-\xi) \cdot x_1 + \lambda \cdot x_2$$

$$y_b = (1-\xi) \cdot y_1 + \xi \cdot y_2$$

e.g., with reference to the notation already introduced previously, $$x_1 = C_x(\text{endpoint}_1); \; y_1 = C_y(\text{endpoint}_1)$$

$$x_2 = C_x(\text{endpoint}_2); \; y_2 = C_y(\text{endpoint}_2).$$

It will be appreciated that, in one or more embodiments, it is possible to operate in the same way for the value y, for example, using the same values of t for both co-ordinates.

The procedure described previously makes it possible to arrive (for example, on the basis of considerations on clipping, according to the criteria described more fully in what follows) to values $x_b$, $y_b$ that may constitute the co-ordinates of the point resulting from chromatic gamut extension, for instance, to the boosted point designated by $P'_m$ for example, in FIG. 8.

In a way independent of the criteria adopted for identifying the iso-hue extension paths passing through the points $P_m$ subjected to gamut extension (hence also irrespective of the examples of interpolation examined previously—which are hence in any case to be understood as non-binding examples), in one or more embodiments the degree of the action of extension or boosting—in practice how far the point $P'_m$ departs from the point $P_m$—can be given in different ways such as, for example:
  i) using a single boosting factor, for example, defined by the user, for all the colors, e.g., for all the iso-hue paths;
  ii) using a different boosting factor according to the iso-hue path so as to prevent clipping effects; and
  iii) using a different boosting factor according to the iso-hue path tolerating a certain amount of clipping.

The first possibility exemplified previously can be implemented by defining, for example, a single boosting factor $t_{boost}$. For example, the user can define a value of his own choice such as, for example $t_{boost} = 0.2$.

The other two possibilities (preventing clipping, or else tolerating a certain amount of clipping) may take into account the fact that it is possible to avoid clipping in so far as the extended or boosted point does not fall outside the gamut of the destination device (e.g., the chromatic gamut generated by the laser 10): hence, if an excessively high value of $t_{boost}$ is used, some colors could be mapped into colors that fall outside the gamut of the destination device, thus not being displayable.

The limit or boundary of the gamut of the destination device (for example, the laser projector 10 exemplified in FIG. 1) may be designated as $LRGB^\partial$. In the figures, this limit or boundary is exemplified as a triangle $T_L$.

The limit or boundary of the starting gamut may be instead designated by $sRGB^\partial$. In the figures, this limit or boundary is exemplified as a triangle $T_S$.

For example, in one or more embodiments, for each iso-hue extension path it is possible to identify the values of t (designated, respectively, as $t^s_{max}$ and $t^L_{max}$) such that the iso-hue path used for boosting intersects, respectively, $sRGB^\partial$ and $LRGB^\partial$ and stop the extension so as not to depart (at least appreciably) from $LRGB^\partial$, for example, stopping the extension at $t^L_{max}$.

With reference to the strategy indicated previously in point ii), in one or more embodiments clipping can be avoided by simply choosing:

$$t^\partial_{boost} = (t^L_{max} - t^s_{max})/t^s_{max}$$

where $t^s_{max}$ and $t_L^{max}$ represent the values such that, following the samples of the extension path passing through $P_m$, respectively, the limit or boundary $sRGB^\partial$ is crossed and the limit or boundary $LRGB^\partial$ is crossed.

By operating in this way, where the boundaries $sRGB^\partial$ and $LRGB^\partial$ are close to one another, the boosting factor $t^\partial_{boost}$ could be reduced so that a significant boosting effect would not be obtained.

In one or more embodiments, with reference to the strategy designated previously by iii), it is possible to relax the constraint that leads the point resulting from the extension or boosting action to belong to $LRGB^\partial$, accepting a certain amount of clipping.

In one or more embodiments, accepting a certain amount of clipping can correspond to the fact that the colors in the clipping area are to be clipped after boosting, e.g., to be represented by the same color located in the boundary of $LRGB^\partial$, e.g., in the boundary of the triangle $T_L$ represented in the figures. However, this makes it possible to carry out boosting of the points (colors) that are located in the proximity of the clipping area—e.g., before the clipping area, proceeding from the white point WP.

In one or more embodiments, it is hence possible to define a threshold for each iso-hue path.

The criteria outlined previously are exemplified in the form of graphs in FIGS. 11 to 14.

Figure 11:
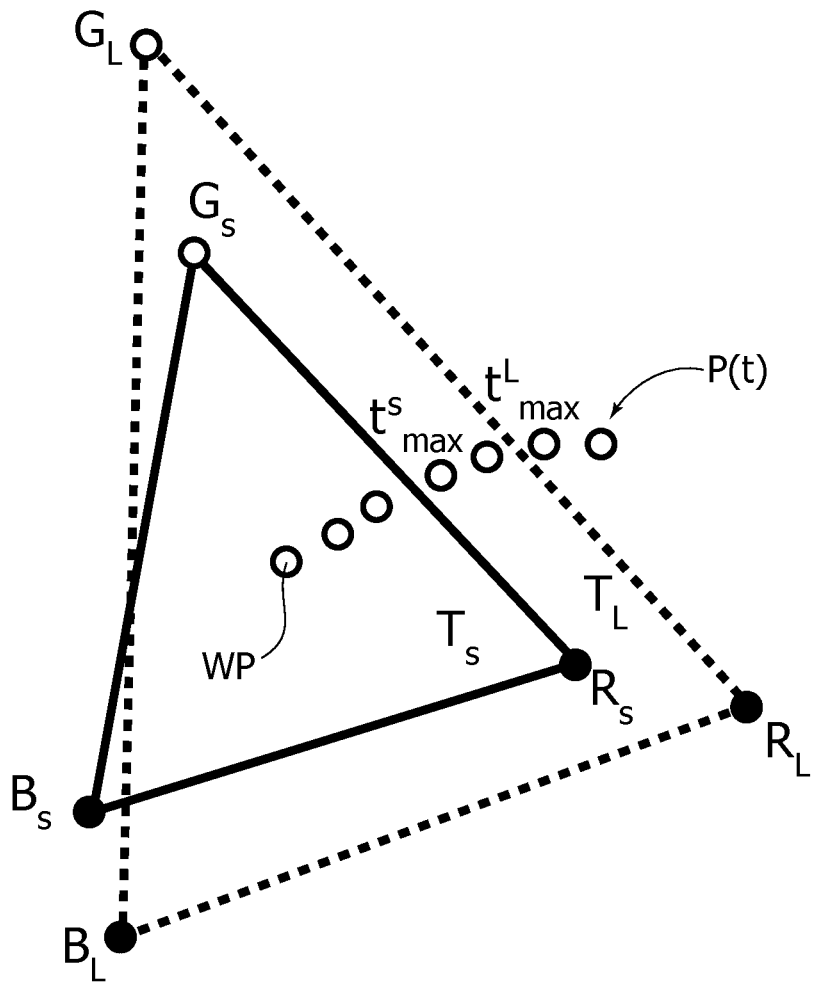
FIGS. 11 to 14 exemplify functions of extension/boosting according to some embodiments.

For example, the scheme of FIG. 11 (referred to an ideal CIE 1931 xyY color space, the co-ordinates of which are not represented so as to render the figure clearer) an iso-hue path is represented, which can be used for the gamut extension from the white point WP to a generic point $P_m'$ with the points $t^s_{max}$ and $t^L_{max}$ highlighted.

Once the primary colors of the two gamuts $sRGB^\partial$ and $LRGB^\partial$ have been fixed, also the areas of the two triangles $T_S$ and $T_L$ are likewise fixed.

Moving along a certain iso-hue path it is therefore possible to locate:
  the first value of the parameter t that causes exit from the triangle $T_S$ (e.g., $t^s_{max}$); and
  the first value of the parameter t that causes exit from the triangle $T_L$ (e.g., $t^L_{max}$).

As has been seen, for a current hue the boosting coefficient such as to prevent clipping can be defined by the relation $$t^\partial_{boost} = (t^L_{max} - t^s_{max})/t^s_{max}$$

Figure 12:
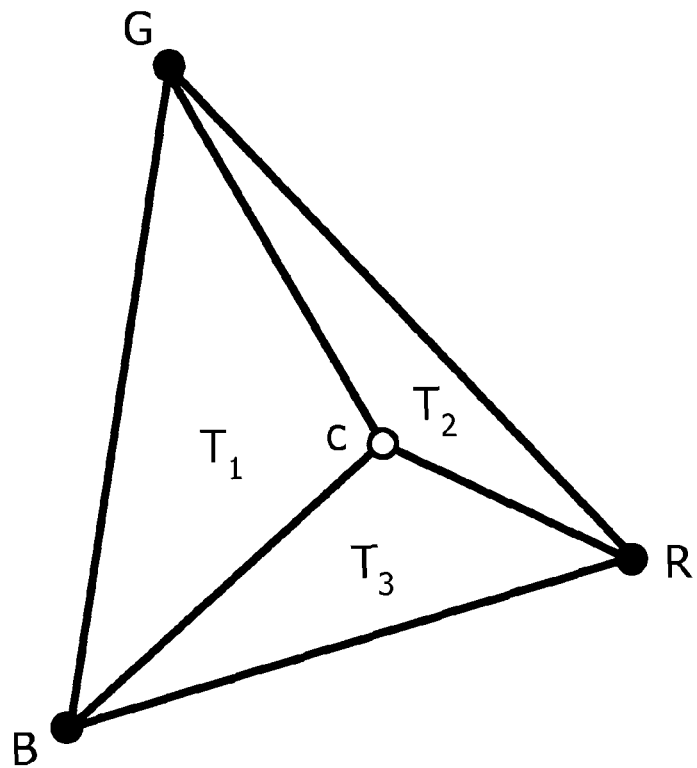
Figure 12:
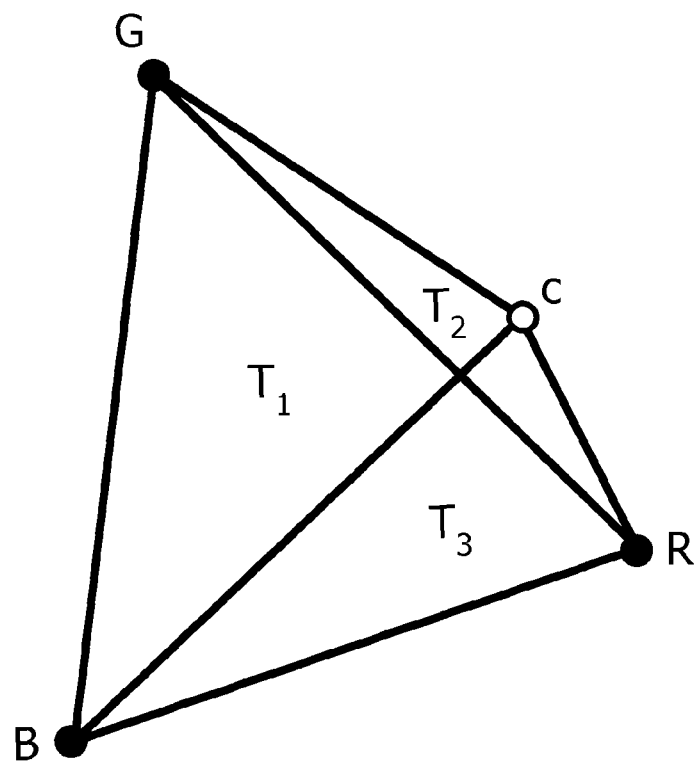

FIG. 12, which comprises two parts indicated by a) and b), represents a criterion for verifying easily whether a given point c located on an iso-hue extension path can lead to an out-of-gamut condition referred to a generic RGB triangle (once again defined on a CIE 1931 xyY system).

The RGB triangle (whether it is a triangle $R_S, G_S, B_S$ corresponding to the triangle $T_S$ or a triangle $R_L, G_L, B_L$ corresponding to the triangle $T_L$) can be considered as being constituted by three triangles $T_1, T_2, T_3$ having, respectively, as vertices:
the points B, G, and C for the triangle $T_1$:
the points B, C, R for the triangle $T_2$; and
the points C, G, R for the triangle $T_3$.

As long as the sum of the areas of the triangles $T_1, T_2, T_3$ is smaller than the area of the RGB triangle, the point c falls within the RGB triangle. If, instead, the sum of the areas of $T_1, T_2, T_3$ is greater than the area of the RGB triangle, the point c is to be considered as falling outside the gamut represented by the triangle.

As already said, this applies both to the triangle $T_S$ and to the triangle $T_L$.

Figure 13:
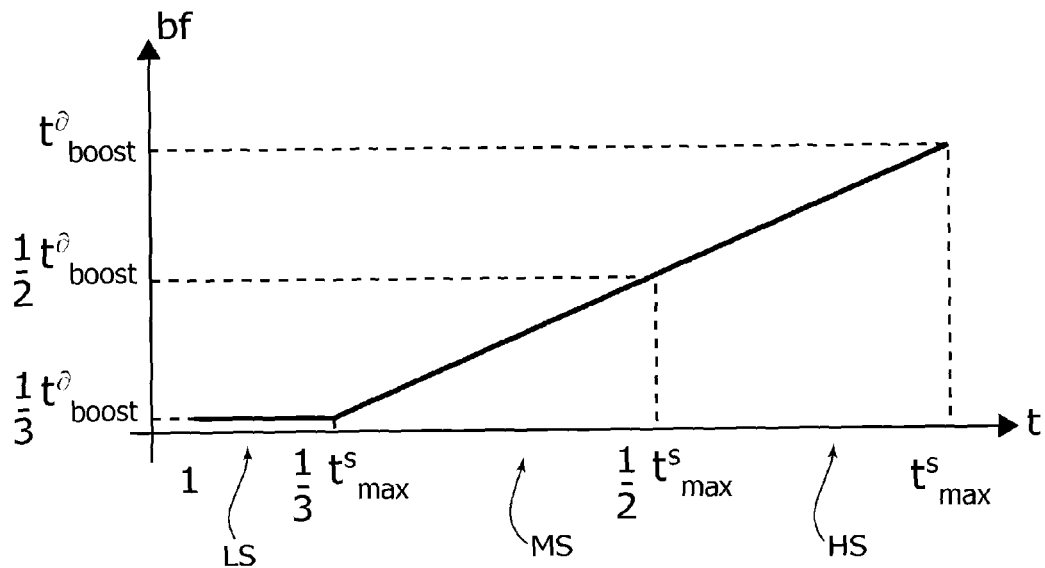
Figure 14:
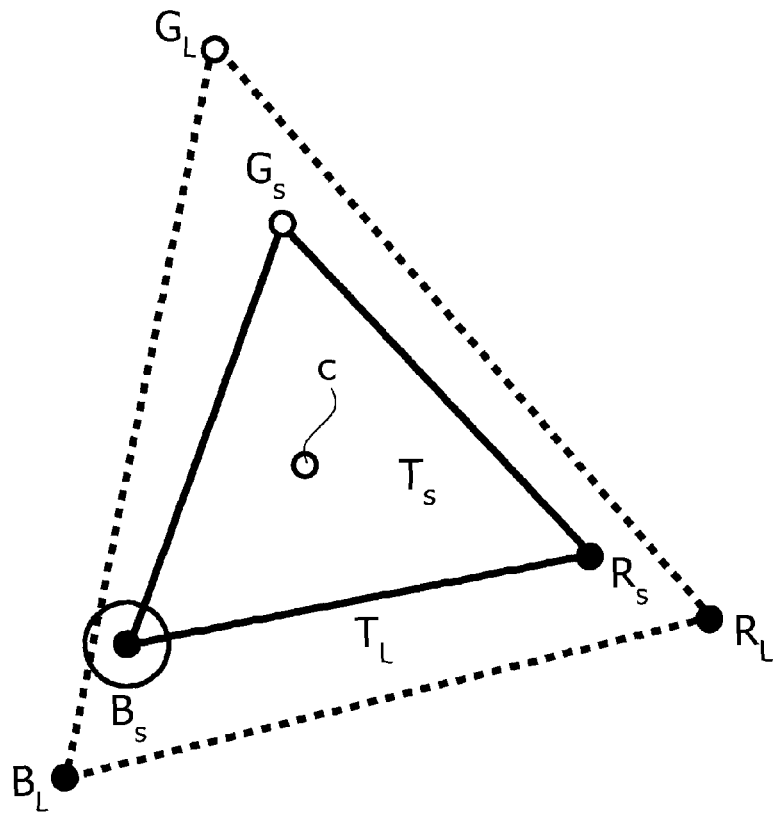

The diagram of FIG. 13 exemplifies the possibility of modulating the boosting factor bf (on the ordinates) as a function of the value of the parameter t prior to boosting, distinguishing, for example, a low-saturation area LS, a medium-saturation area MS, and a high-saturation area HS.

The division of the corresponding fields (both for the parameter t and for the boosting factor bf) into bands of equal width with value of the boosting factor bf initially constant in the low-saturation area LS and then designed to increase according to a linear law in the areas MS and HS is to be deemed as being provided purely by way of example. The same applies also to the division of the corresponding fields of variation into bands of non-uniform width and/or to the number of said bands.

FIG. 14 exemplifies, once again with reference to the two triangles $T_S$ and $T_L$ already represented in FIG. 11, the possibility, to which reference has already been made previously, of portions of the two gamuts represented by the aforesaid triangles to be close to one another, in a condition where a control of clipping is carried out with a limited increase in saturation.

Also in this case it is possible to obtain an appreciable increase of saturation by operating on an iso-hue extension path passing through one of these areas. For the aforesaid extension path, the clipping phenomenon can be tolerated to a greater extent by increasing the value of $t^3_{boost}$ for the corresponding hue, accepting for this hue a clipping value that is higher (even significantly higher) than the one accepted for other hues.

In the CIE 1931 xyY space it is possible to define chromatic classes. In one or more embodiments, the points of the curves associated to these classes can be treated by applying different boosting factors defined as a function of the specific color class. For example, the boosting factor may be limited more markedly for the chromatic classes corresponding to the skin hues so as to prevent an excessive gamut extension in this case.

Some embodiments may take the form of or comprise computer program products. For example, according to one embodiment there is provided a computer readable medium comprising a computer program adapted to perform one or more of the methods or functions described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof. For example, embodiments of a projector may be implemented as discussed above (e.g., partially in hardware, partially with controllers executing instructions, etc.).

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:
1. A method, comprising:
generating an output color image from an input color image by subjecting the input color image to chromatic gamut extension, the generating including:
identifying, for points in the input color image subjected to chromatic gamut extension, closest iso-hue curves of a plurality of determined iso-hue curves in a CIE1931xyY color space; and
interpolating, from the identified closest iso-hue curves of the plurality of iso-hue curves, extension paths for chromatic gamut extension, the interpolating including:
partitioning the CIE1931xyY color space into a grid of cells;
locating, for a point subjected to chromatic gamut extension, intersections of horizontal and vertical lines passing through the point subjected to chromatic gamut extension and a set of iso-hue curves of the plurality of determined iso-hue curves passing through the cell of the grid where the point is located; and
selecting, as the closest iso-hue curves, iso-hue curves whose intersections are closest to the point subjected to chromatic gamut extension.
2. The method of claim 1 wherein said closest iso-hue curves are sampled by points and the interpolating comprises:
identifying a first pair and a second pair of points closest to the point subjected to extension on the one and the other of said closest iso-hue curves, respectively;
calculating a first point and a second point of intersection between the vertical line passing through the point subjected to chromatic gamut extension and the one and the other of the segments between the points of said first pair and said second pair of points, respectively; and calculating an interpolated extension path for the chromatic gamut extension of said point as a parametric curve passing through said point subjected to chromatic gamut extension.

3. The method of claim 2 wherein an extension parameter t of the chromatic gamut extension is defined according to:

$$t=(y_m-y_2)/(y_1-y_2)$$

where $y_m$, $y_1$ and $y_2$ are y coordinates of said point subjected to chromatic gamut extension, said first point of intersection and said second point of intersection.

4. The method of claim 3, comprising calculating said extension paths by one of:
a) non-compensated interpolation:

$$x_1(k)=(1-t')\cdot x_2(k)+t'\cdot x_1(k)$$

$$y_1(k)=(1-t')\cdot y_2(k)+t'\cdot y_1(k),$$

and
b) compensated interpolation:

$$x_1(k)=(1-t_{ec})\cdot x_2(k)+t_{ec}\cdot x_1(k)$$

$$y_1(k)=(1-t_{ec})\cdot y_2(k)+t_{ec}\cdot y_1(k)$$

where $x_1(k)$, $y_1(k)$, $x_2(k)$, $y_2(k)$ are the coordinates, of said first point and second point of intersection, respectively, of a k-th sample of said sampling by points, $t_{ec}=[(y_m+\delta_E)-y_2]/(y_1-y_2)$, and $\delta_E=abs(y_m-y_{intercept})$ is the error associated to said non-compensated interpolation, with abs denoting absolute value and $y_{intercept}$ being the y coordinate of an effective intersection point of the interpolation curve and t', $t_{ec}$ are respective extension parameters.

5. The method of claim 2, wherein said iso-hue extension paths in the CIE1931xyY color space are sampled by points, the method comprising:

locating, for the points subjected to chromatic gamut extension, two points over the respective iso-hue extension path which are closest to the point subjected to chromatic gamut extension, said iso-hue path being expressed in parametric form as $C_x(t),C_y(t)$ with values of the parameters $t_1$, $t_2$ such that $C_x(t_1)=x_1$ and $C_x(t_2)=x_2$, with $t_{mpos}=(x_m-x_1)/(x_2-x_1)$, where $x_m$, $x_1$, $x_2$ are coordinates of the point ($P_m$) subject to chromatic gamut extension and said two closest points, respectively; and using for said extension parameter an initial value $t_{start}$ equal to $t_i+t_{mpos}$ with i=1, 2 and an end value $t_{end}$ equal to $t_{start}+(t_{start}\cdot t_{boost})$, wherein $t_{boost}$ is an extension parameter.

6. The method of claim 5, comprising:
locating, over the respective iso-hue extension path, four points around the point subjected to chromatic gamut extension defined as:

$$x_1=C_x(endpoint_1)$$

$$y_1=C_y(endpoint_1)$$

$$x_2=C_x(endpoint_2)$$

$$y_2=C_y(endpoint_2)$$

where:
$endpoint_1=\lfloor t_{end}\rfloor$
$endpoint_2=\lceil t_{end}\rceil$ ;

calculating the distance $$\xi=t_{end}-\lfloor t_{end}\rfloor \; ; \text{ and}$$

calculating the coordinates $x_b$, $y_b$ deriving from the extension as:

$$x_b=(1-\xi)\cdot x_1+\xi\cdot x_2$$

$$y_b=(1-\xi)\cdot y_1+\xi\cdot y_2.$$

7. The method of claim 2 wherein said iso-hue paths are defined in the LCh or Lab color space and transformed to the CIE1931xy color space.

8. The method of claim 2, comprising performing said chromatic gamut extension along said iso-hue paths in the CIE1931xyY color space, with boosting factors selected according to one of:
selecting a single boosting factor for all colors from a plurality of boosting factors; and
selecting different boosting factors for different iso-hue paths.

9. The method of claim 2, comprising performing said chromatic gamut extension along said iso-hue paths in the CIE1931xyY color space, with extension or boosting factors selected to reduce clipping effects.

10. The method of claim 9, comprising avoiding clipping effects over at least one of said extension paths by:
defining a chromatic gamut boundary before chromatic gamut extension;
defining a chromatic gamut boundary after chromatic gamut extension;
using a chromatic gamut extension parameter $t^\partial_{boost}$ $$t^\partial_{boost}=(t^L_{max}-t^s_{max})/t^s_{max}$$

wherein $t^s_{max}$ and $t^L_{max}$ are the values along said at least one of said extension paths exiting said chromatic gamut boundary before chromatic gamut extension and said chromatic gamut boundary after chromatic gamut extension, respectively.

11. The method of claim 9, comprising performing said color gamut extension with different clipping values for different iso-hue extension paths.

12. The method of claim 1, comprising subjecting said color images to at least one set of processing operations selected from:
conversion to a RGB format before said chromatic gamut extension;
conversion to a XYZ format and conversion to a xyY format before said chromatic gamut extension with subsequent complementary conversions after said chromatic gamut extension; and
linearization using gamma decoding, before said chromatic gamut extension with complementary processing, using gamma encoding, after said chromatic gamut extension.

13. An apparatus, comprising:
one or more memories; and
one or more processing devices coupled to the one of more memories, wherein the one or more processing devices, in operation, generate an output color image from an input color image by subjecting the input color image to chromatic gamut extension, the generating including:
identifying, for each point in the input color image subjected to chromatic gamut extension, closest iso-hue curves of a plurality of determined iso-hue curves in a CIE1931xyY color space; and interpolating, from the identified closest iso-hue curves of the plurality of iso-hue curves, extension paths for chromatic gamut extension, the interpolating including:
  partitioning the CIE1931xyY color space into a grid of cells;
  locating, for a point subjected to chromatic gamut extension, intersections of horizontal and vertical lines passing through the point subjected to chromatic gamut extension and a set of iso-hue curves of the plurality of determined iso-hue curves passing through the cell of the grid where the point is located; and
  selecting, as the closest iso-hue curves, iso-hue curves having intersections closest to the point subjected to chromatic gamut extension.

14. The apparatus of claim 13 wherein said closest iso-hue curves are sampled by points and the interpolating comprises:
  identifying a first pair and a second pair of points closest to the point subjected to extension on the one and the other of said closest iso-hue curves, respectively;
  calculating a first point and a second point of intersection between the vertical line passing through the point subjected to chromatic gamut extension and the one and the other of the segments between the points of said first pair and said second pair of points, respectively; and
  calculating an interpolated extension path for the chromatic gamut extension of said point as a parametric curve passing through said point subjected to chromatic gamut extension.

15. The apparatus of claim 14 wherein an extension parameter t of the chromatic gamut extension is defined according to:

$$t=(y_m-y_2)/(y_1-y_2)$$

where $y_m$, $y_1$ and $y_2$ are y coordinates of said point subjected to chromatic gamut extension, said first point of intersection and said second point of intersection.

16. The apparatus of claim 15 wherein the one or more processing devices are configured to calculate said extension paths by one of:
  a) non-compensated interpolation:

$$x_1(k)=(1-t')\cdot x_2(k)+t'\cdot x_1(k)$$

$$y_1(k)=(1-t')\cdot y_2(k)+t'\cdot y_1(k),$$

and
  b) compensated interpolation:

$$x_1(k)=(1-t_{ec})\cdot x_2(k)+t_{ec}\cdot x_1(k)$$

$$y_1(k)=(1-t_{ec})\cdot y_2(k)+t_{ec}\cdot y_1(k)$$

where $x_1(k)$, $y_1(k)$, $x_2(k)$, $y_2(k)$ are the coordinates, of said first point and second point of intersection, respectively, of a k-th sample of said sampling by points, $t_{ec}=[(y_{m+}\delta_E)-y_2]/(y_1-y_2)$, and $\delta_E=abs(y_m-y_{intercept})$ is the error associated to said non-compensated interpolation, with abs denoting absolute value and $y_{intercept}$ being the y coordinate of an effective intersection point of the interpolation curve and t', $t_{ec}$ are respective extension parameters.

17. The apparatus of claim 14 wherein said iso-hue extension paths in the CIE1931xyY color space are sampled by points, the method comprising:
  locating, for the points subjected to chromatic gamut extension, two points over the respective iso-hue extension path which are closest to the point subjected to chromatic gamut extension, said iso-hue path being expressed in parametric form as $C_x(t),C_y(t)$ with values of the parameters $t_1$, $t_2$ such that $C_x(t_1)=x_1$ and $C_x(t_2)=x_2$, with $t_{mpos}=(x_m-x_1)/(x_2-x_1)$, where $x_m$, $x_1$, $x_2$ are coordinates of the point ($P_m$) subject to chromatic gamut extension and said two closest points, respectively; and
  using for said extension parameter an initial value $t_{start}$ equal to $t_i+t_{mpos}$ with i=1, 2 and an end value $t_{end}$ equal to $t_{start}+(t_{start}\cdot t_{boost})$, wherein $t_{boost}$ is an extension parameter.

18. The apparatus of claim 17 wherein the one or more processing devices are configured to:
  locate, over the respective iso-hue extension path, four points around the point subjected to chromatic gamut extension defined as:

$$x_1=C_x(\text{endpoint}_1)$$

$$y_1=C_y(\text{endpoint}_1)$$

$$x_2=C_x(\text{endpoint}_2)$$

$$y_2=C_y(\text{endpoint}_2)$$

where:
  $\text{endpoint}_1=\lfloor t_{end}\rfloor$
  $\text{endpoint}_2=\lceil t_{end}\rceil$ ;
  calculating the distance $$\xi=t_{end}-\lfloor t_{end}\rfloor \ ; \text{ and}$$

calculate the coordinates $x_b$, $y_b$ deriving from the extension as:

$$x_b=(1-\xi)\cdot x_1+\xi\cdot x_2$$

$$y_b=(1-\xi)\cdot y_1+\xi\cdot y_2.$$

19. The apparatus of claim 14 wherein said iso-hue paths are defined in the LCh or Lab color space and transformed to the CIE1931xy color space.

20. The apparatus of claim 14 wherein the one or more processing devices are configured to perform said chromatic gamut extension along said iso-hue paths in the CIE1931xyY color space, with boosting factors selected according to one of:
  selecting a single boosting factor for all colors from a plurality of boosting factors; and
  selecting different boosting factors for different iso-hue paths.

21. The apparatus of claim 14 wherein the one or more processing devices are configured to perform said chromatic gamut extension along said iso-hue paths in the CIE1931xyY color space, with extension or boosting factors selected to reduce clipping effects.

22. The apparatus of claim 21 wherein the one or more processing devices are configured to avoid clipping effects over at least one of said extension paths by:
  defining a chromatic gamut boundary before chromatic gamut extension;
  defining a chromatic gamut boundary after chromatic gamut extension;
  using a chromatic gamut extension parameter $t^3_{boost}$ $$t^3_{boost}=(t^L_{max}-t^s_{max})/t^s_{max}$$

wherein $t^s_{max}$ and $t^L_{max}$ are the values along said at least one of said extension paths exiting said chromatic gamut boundary before chromatic gamut extension and said chromatic gamut boundary after chromatic gamut extension, respectively.

23. The apparatus of claim 21 wherein the one or more processing devices are configured to perform said color gamut extension with different clipping values for different iso-hue extension paths.

24. The apparatus of claim 13 wherein the one or more processing devices are configured to subject said color images to at least one set of processing operations selected from:
- conversion to a RGB format before said chromatic gamut extension;
- conversion to a XYZ format and conversion to a xyY format before said chromatic gamut extension with subsequent complementary conversions after said chromatic gamut extension; and
- linearization using gamma decoding, before said chromatic gamut extension with complementary processing, using gamma encoding, after said chromatic gamut extension.

25. A system, comprising:
an input configured to receive color images; and
image processing circuitry coupled to the input and configured to generate an output color image from an input color image by subjecting the input color image to chromatic gamut extension, the generating including:
identifying, for points in the color image subjected to chromatic gamut extension, closest iso-hue curves of a plurality of determined iso-hue curves in a CIE1931xyY color space; and
interpolating, from the identified closest iso-hue curves of the plurality of iso-hue curves, extension paths for chromatic gamut extension, the interpolating including:
partitioning the CIE1931xyY color space into a grid of cells;
locating, for a point subjected to chromatic gamut extension, intersections of horizontal and vertical lines passing through the point subjected to chromatic gamut extension and a set of iso-hue curves of the plurality of determined iso-hue curves passing through the cell of the grid where the point is located; and
selecting, as the closest iso-hue curves, iso-hue curves having intersections closest to the point subjected to chromatic gamut extension.

26. The system of claim 25 wherein said closest iso-hue curves are sampled by points and the interpolating comprises:
identifying a first pair and a second pair of points closest to the point subjected to extension on the one and the other of said closest iso-hue curves, respectively;
calculating a first point and a second point of intersection between the vertical line passing through the point subjected to chromatic gamut extension and the one and the other of the segments between the points of said first pair and said second pair of points, respectively; and
calculating an interpolated extension path for the chromatic gamut extension of said point as a parametric curve passing through said point subjected to chromatic gamut extension.

27. The system of claim 26 wherein the image processing circuitry is configured to perform said chromatic gamut extension along said iso-hue paths in the CIE1931xyY color space, with extension or boosting factors selected to reduce clipping effects.

28. The system of claim 25, comprising a projector.

29. A non-transitory computer-readable medium whose contents configure a digital processing device to generate an output color image from an input color image by subjecting points in the input color image to chromatic gamut extension processing, the processing comprising:
identifying, for each point in the color image subjected to chromatic gamut extension, closest iso-hue curves of a plurality of determined iso-hue curves in a CIE1931xyY color space; and
interpolating, from the identified closest iso-hue curves of the plurality of iso-hue curves, extension paths for chromatic gamut extension, the interpolating including:
partitioning the CIE1931xyY color space into a grid of cells;
locating, for a point subjected to chromatic gamut extension, intersections of horizontal and vertical lines passing through the point subjected to chromatic gamut extension and a set of iso-hue curves of the plurality of determined iso-hue curves passing through the cell of the grid where the point is located; and
selecting, as the closest iso-hue curves, iso-hue curves having intersections closest to the point subjected to chromatic gamut extension.

30. The non-transitory computer-readable medium of claim 29 wherein said closest iso-hue curves are sampled by points and the interpolating comprises:
identifying a first pair and a second pair of points closest to the point subjected to extension on the one and the other of said closest iso-hue curves, respectively;
calculating a first point and a second point of intersection between the vertical line passing through the point subjected to chromatic gamut extension and the one and the other of the segments between the points of said first pair and said second pair of points, respectively; and
calculating an interpolated extension path for the chromatic gamut extension of said point as a parametric curve passing through said point subjected to chromatic gamut extension.

31. The non-transitory computer-readable medium of claim 30 wherein the processing comprises performing said chromatic gamut extension along said iso-hue paths in the CIE1931xyY color space, with extension or boosting factors selected to reduce clipping effects.

* * * * *